US009813783B2

(12) United States Patent
Kanthapanit et al.

(10) Patent No.: US 9,813,783 B2
(45) Date of Patent: Nov. 7, 2017

(54) MULTI-CAMERA DATASET ASSEMBLY AND MANAGEMENT WITH HIGH PRECISION TIMESTAMP REQUIREMENTS

(71) Applicant: Intel Corporation, Santa Clara, CA (US)

(72) Inventors: Chanitnan (Lu) Kanthapanit, Hillsboro, OR (US); Richard Newpol, Pittsburgh, PA (US); Joseph A. Hook, Pittsburgh, PA (US); Ramkumar Narayanswamy, Boulder, CO (US); Sheldon L. Sun, Portland, OR (US); Kevin M. Taggart, Beaverton, OR (US); Christopher T. Sauvageau, Forest Grove, OR (US); Rao S. Pitla, Beaverton, OR (US); Yassir Mosleh, Wilsonville, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/089,118

(22) Filed: Apr. 1, 2016

(65) Prior Publication Data

US 2017/0289646 A1 Oct. 5, 2017

(51) Int. Cl.
*H04N 9/475* (2006.01)
*H04N 21/8547* (2011.01)
(Continued)

(52) U.S. Cl.
CPC ........... *H04N 21/8547* (2013.01); *H04N 5/05* (2013.01); *H04N 5/0675* (2013.01); *H04N 5/247* (2013.01); *H04R 1/326* (2013.01)

(58) Field of Classification Search
USPC ....... 348/516, 500, 510, 512, 513, 521, 525, 348/537, 439.1, 376, 211.9, 231.5, 153,
(Continued)

(56) References Cited

U.S. PATENT DOCUMENTS

| 6,877,007 B1 * | 4/2005 | Hentzel | G06Q 30/02 |
| | | | 707/999.01 |
| 2002/0180743 A1 * | 12/2002 | Owen | G06F 13/1605 |
| | | | 345/541 |

(Continued)

OTHER PUBLICATIONS

PCT Application No. PCT/US2017/017029, International Search Report and the Written Opinion, May 24, 2017, 16 pgs.

*Primary Examiner* — Jefferey F Harold
*Assistant Examiner* — Mustafizur Rahman
(74) *Attorney, Agent, or Firm* — Blakely, Sokoloff, Taylor & Zafman LLP

(57) ABSTRACT

A method and apparatus for synchronizing data captured by multiple image and non-image data capture devices using timing information. In one embodiment, the device comprises a plurality of interfaces operable to receive streaming data from each of a plurality of image and non-image capture devices and timestamping logic implemented, at least in part, in hardware and coupled to the plurality of interfaces to generate and assign timestamp information to each set of data captured by individual capture devices of the plurality of image and non-image capture devices to indicate when the data was captured, where the timestamp information is synchronized to a single timestamp reference clock. The device also comprises processing logic coupled to the timestamping logic to group image data from image capture devices with data from non-image capture devices using the timestamp information.

24 Claims, 16 Drawing Sheets

(51) Int. Cl.
*H04N 5/067* (2006.01)
*H04N 5/05* (2006.01)
*H04N 5/247* (2006.01)
*H04R 1/32* (2006.01)

(58) Field of Classification Search
USPC .............. 348/158, 174, 714, 719, 725, 838; 386/207, 223, 224, 292, 326; 715/203, 715/700, 716, 719
See application file for complete search history.

(56) References Cited

U.S. PATENT DOCUMENTS

| | | | |
|---|---|---|---|
| 2003/0023687 A1* | 1/2003 | Wolfe | G06Q 30/0277 709/206 |
| 2003/0037138 A1* | 2/2003 | Brown | G06F 21/55 709/225 |
| 2004/0153969 A1* | 8/2004 | Rhodes | G06F 17/30722 715/209 |
| 2008/0016455 A1* | 1/2008 | Furukawa | G06F 17/24 715/770 |
| 2008/0036864 A1 | 2/2008 | McCubbrey | |
| 2008/0266403 A1* | 10/2008 | Hsu | H04N 1/00127 348/207.2 |
| 2009/0293093 A1* | 11/2009 | Igarashi | H04N 21/23439 725/115 |
| 2011/0032858 A1* | 2/2011 | Lohmar | H04L 12/189 370/312 |
| 2011/0242356 A1 | 10/2011 | Aleksic | |
| 2011/0288863 A1* | 11/2011 | Rasmussen | G06F 17/2775 704/235 |
| 2012/0327780 A1* | 12/2012 | Moreman | H04L 45/16 370/241 |
| 2013/0163816 A1* | 6/2013 | Hunt, Jr. | G06K 9/00771 382/103 |
| 2014/0023246 A1* | 1/2014 | Bolding | G06K 9/00885 382/118 |
| 2014/0072270 A1* | 3/2014 | Goldberg | H04N 9/87 386/223 |
| 2014/0095990 A1* | 4/2014 | Blanchard | G06F 17/24 715/255 |
| 2014/0240469 A1* | 8/2014 | Lee | H04N 13/025 348/48 |
| 2014/0257729 A1 | 9/2014 | Wolf | |
| 2015/0016529 A1* | 1/2015 | Wan | H04N 19/51 375/240.16 |
| 2015/0185054 A1 | 7/2015 | Hesch et al. | |
| 2015/0189190 A1 | 7/2015 | Fung et al. | |
| 2015/0310311 A1* | 10/2015 | Shi | G06F 15/8023 382/158 |

* cited by examiner

MULTI-CAMERA DATASET ASSEMBLY AND MANAGEMENT WITH HIGH PRECISION TIMESTAMP REQUIREMENTS

FIELD OF THE INVENTION

Embodiments of the present invention relate to the field of data capture by data capture devices (e.g., sensors); more particularly, embodiments of the present invention relate to synchronizing data captured by data capture devices using timing information.

BACKGROUND OF THE INVENTION

While operating a multi-camera system, there are several scenarios that may cause data loss, these include the following: misbehaving hardware, system performance (host cannot accept all incoming data), and transient/startup conditions especially during camera image sensor enable changes. These scenarios cause the data from one or more stream sources to be lost or be delivered at different instances of time.

Currently, a mechanism for synchronized capture from multiple heterogeneous cameras, array of microphones and other sensors (e.g., positional sensors, environmental sensors, etc.) do not exist to microsecond level accuracy. Therefore, system designers that desire such synchronization must design and build a system using programmable logic, firmware and/or other methods to implement precision synchronization capabilities.

Certain sensor manufacturers provide synchronization mechanisms for sensors of the same type, but do not provide a complete solution for streaming synchronized video data to an application. For example, image sensors such as Aptina's MT9M114 allow synchronized capture from two or more sensors of the same type by connecting them in a daisy chain manner and triggering capture using one of the sensors as the master. However, this mechanism is limited to the same type of sensor and is typically used in stereoscopic image capture applications. It is also limited to aligned captures, with all sensors imaging simultaneously. It does not allow for deliberately skewed captures.

Other sensors expose a general purpose input/output (GPIO) pin or a Frame-Sync pin that can be used to trigger capture on the sensor. But, it is the responsibility of the developer to build a system using this pin to synchronize multiple cameras and aggregate the video streams from each of them.

Today, there are a number of academic papers that describe camera array systems built using specific sensors and hardware and describe high performance imaging using large camera arrays. However, the system design is described for the specific image sensors and their architecture and does not account for modern data streaming interfaces used in mobile devices such as, for example, Mobile Industry Processor Interface MIPI)/Universal Serial Bus 3.0 (USB3.0), etc. The systems they describe use homogenous image sensors and did not address the case of synchronizing to heterogeneous image sensors or additional sensors such as microphone arrays and positional sensors. Furthermore, they do not address generating timestamps in the presence of intermediate image-signal processing units in the data path.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
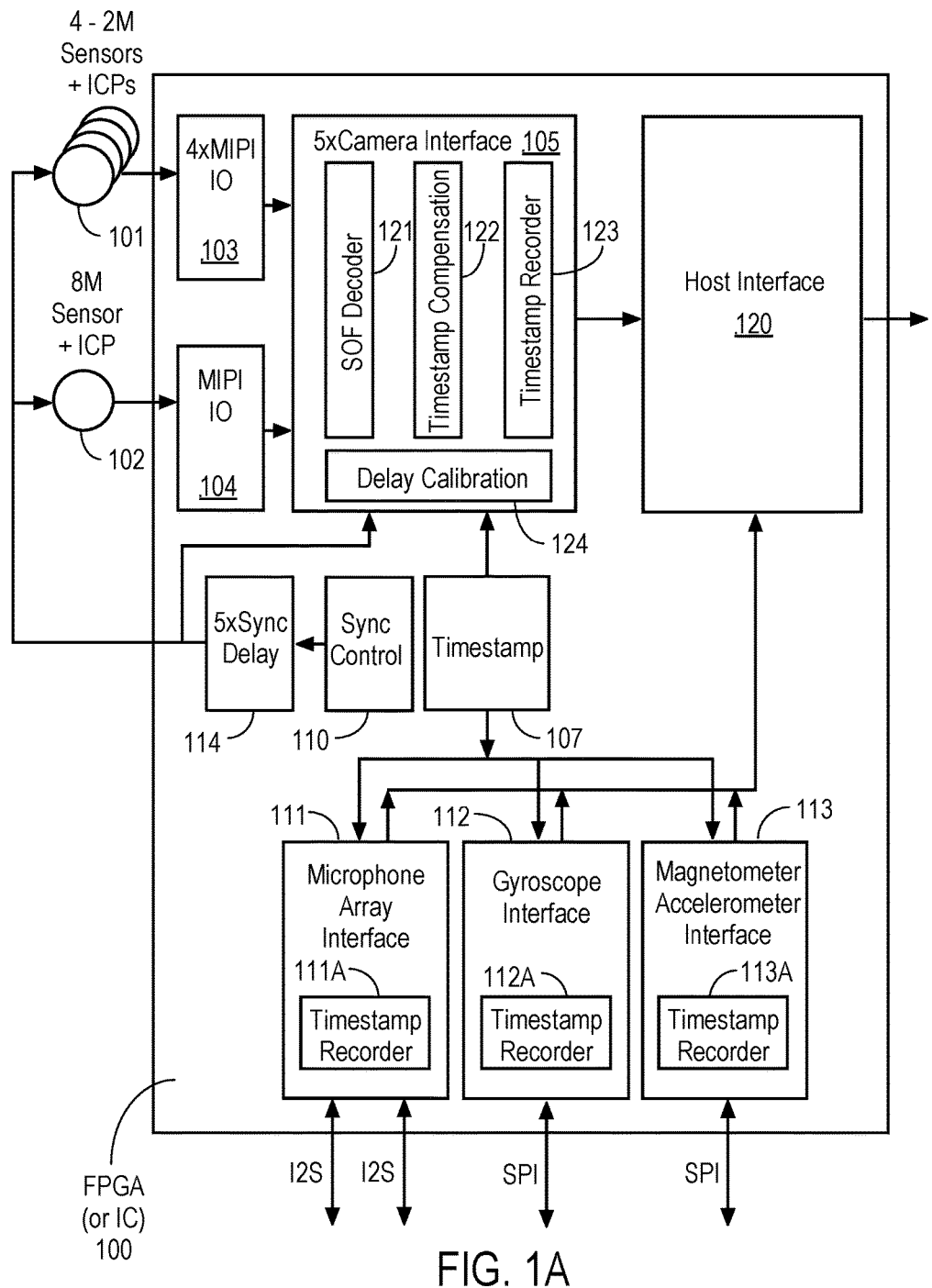
FIG. 1A is a block diagram of one embodiment of a field programmable gate array (FPGA) used in a camera system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A multi-camera, multi-sensor system and method for managing data in such a system are described. In one embodiment, such a camera system is used to extract depth and provide new forms of media and layer effects.

In one embodiment, the multi-camera system comprises four low resolution cameras (e.g., 2 MP 1080p), one high resolution camera (e.g., 8 MP 3264×2448), four microphones, gyroscope, accelerometer, and magnetometer sensor synchronized together to capture 3D multimedia video data. Note that other multi-camera, multi-sensor systems may have more or less cameras and/or sensors. In one embodiment, the multi-camera system aligns all the datasets from the image and non-image sensors to a 1 microsecond timer with a 10 us tolerance/accuracy. This is referred to herein as the synchronization requirement.

In one embodiment, each of the camera, audio, gyroscope, accelerometer, magnetometer sensors in a multi-camera system is referred to as a stream source. A "frame" is defined as data captured from each stream source at each capture event or time. Frames from all stream sources are grouped together as a frameset based on the frames' timestamps. If framesets are constructed with missing data, or time-mismatched data, it leads to distorted multimedia datasets.

To facilitate the aligning of data from image and non-image sensors in a multi-camera system, two techniques are described herein. These include (1) a time align staging process which resolves the dropped frame issue described above, and (2) an output first-in first-out (FIFO) process, which increases efficiency on frameset storage and retrieval. The time align staging process assembles complete framesets and handles unsynchronized framesets.

In addition to forming valid frame-sets, the multi-camera, multi-sensor system has to process the image, voice and positional data at real-time frame rates. Therefore, speed and efficiency in resource utilization is another fundamental requirement of embodiments of multi-camera, multi-sensor system. Given this requirement, the output FIFO process controls storage and retrieval of the datasets. In one embodiment, this is done using pointer manipulation to avoid data structure-copies. This reduces memory usage and increases the data processing speed.

As mentioned above, one embodiment of the multi-camera system comprises four low resolution cameras, one high resolution camera, four microphones, magnetometer and positional sensors such as the accelerometer and gyroscopes. In one embodiment, on every capture window for multi-camera, there are image frames from a total of five cameras, audio data frames from four microphones, and sensor data frames from the gyroscope, the accelerometer, and the magnetometer. The techniques described herein could be extended to additional sensor types and additional number of sensors. In one embodiment, one of the fundamental requirements for multi-camera systems is that the image, voice and positional data be synchronized and the temporal relationship between the various frames captured is highly deterministic and repeatable.

In one embodiment, the multi-camera hardware system is responsible for preparing the synchronized data before it is sent to the host computer platform via an interface (e.g., USB, USB3). In one embodiment, the multi-camera system includes a processing unit (e.g., FPGA) that aggregates the streaming video streams from each of the cameras, assigns timestamps to them so that corresponding frames from each of the cameras that were acquired at the same time can be reliably identified.

Non-image sensors tend to be a continuous stream of data independent of the camera frames. Thus, data from non-image sensors are timestamped based on the time when the samples are acquired by the time stamping logic. Since these sensors generate periodic samples, all samples captured during an image capture frame period are aggregated into a single packet and assigned one timestamp. In one embodiment, the timestamp chosen is the timestamp of the first sample after start of a frame period. That choice was somewhat arbitrary, but simplified correlation of image data to the other sensor values. In an alternate embodiment, a timestamp is provided for every sample, which increases the processing/storage requirements, in exchange for not having to calculate the timestamp for intermediate samples.

Since the samples are periodic, the exact time of capture for any sample can be calculated based on the reference timestamp and the number of samples between the sample of interest and the reference sample. In one embodiment, each audio sample from a microphone is 24 bits, and the positional sensors have a triplet of values—X, Y, and Z.

In one embodiment, the system obtains synchronized video data captured from an array of multiple, heterogeneous cameras. FIG. 1A is a block diagram of one embodiment of processing device (e.g., an FPGA (or integrated circuit (IC)) in a multi-camera, multi-sensor system.

Referring to FIG. 1A, camera and image processors are connected via a MIPI interface. Specifically, there are 4 1080p cameras 101 and one 8 Mpix camera 102. In one embodiment, each of cameras 101 and 102 includes an image processing unit (e.g., Image CoProcessor (ICP)) associated with it. In one embodiment, each cameras and its image processing unit are in separate modules; in another embodiment, they are in the same module.

The output of each of the image processing units is terminated into a processing unit that functions as the master synchronization handler for all data streams. In one embodiment, the processing unit s a field-programmable gate array (FPGA) 100 or other integrated circuit (IC) device (e.g., a processor, controller, etc.). More specifically, the outputs of the image processing units associated with cameras 101 are connected to input/output (I/O) interfaces 103 of FPGA 100. In one embodiment, interfaces 103 are Mobile Industry Processor Interface (MIPI) I/O interfaces that in one embodiment convert the data from one I/O protocol to a digital/pixel based interface. The output of the image processing units associated with camera 102 are input to input/output (I/O) interfaces 104. The outputs from I/O interfaces 103 and 104 are coupled to camera interfaces 105. In one embodiment, there is one camera interface for each of cameras 101 and 102.

In one embodiment, FPGA 100 generates synchronization triggers that are sent to all camera modules in the system that require such a trigger. In one embodiment, the synchronization pulses can be programmed to trigger all cameras at the appropriate times to capture images simultaneously or with a configurable skew. The synchronization (sync) pulses are output from 5×Sync delay 114 under control of sync control 110. In one embodiment, the sync pulses are also sent to camera interface 105 for use in performing timestamp compensation.

FPGA 100 is also responsible for being a data aggregator that collects all synchronized image data and non-image sensor data and applies a timestamp to the data from the sensors. FPGA 100 includes camera interfaces 105 that apply (tag) the captured and processed data received from image sensors (cameras) and image processing units. In one embodiment, each of camera interfaces 105 comprises a Start-of-Frame decoder 121, a timestamp compensation unit 122, a timestamp recorder 123, and a delay calibration unit 124. Start-of-Frame decoder 121 determines the start of frame associated with the captured and processed incoming data that is received from the I/O interfaces 103 and 104.

Timestamp compensation unit 122 performs timestamp compensation to adjust a timestamp received from timestamp generator 107 based on delay information from delay calibration unit 124. Delay calibration unit 124 uses the sync signals generated by sync control 110 and sync delays 111 and the capture delay associated with the camera to determine the overall delay between the time the captured data was received by camera interface 105 and when the data was actually captured by the camera. Delay calibration unit 124 provides the delay amount to timestamp compensation unit 122, which adjusts the timestamp value (e.g., reduces the timestamp value to the time when the data was captured) and provides the updated timestamp value to timestamp recorder 123, which tags the data with the updated timestamp value.

In one embodiment, FPGA 100 includes a number of sensor interfaces for non-image sensors that act as stream sources of non-image data. Specifically, microphone array interface(s) 111 provides an interface for audio data captured by microphones. In one embodiment, data is read from the microphones over I2S (an Inter-IC Sound interface)—a serial interface in which a sample is read from the device every sample period. The interface itself adds some amount of latency due to its serial nature, but several 20.8 microsecond sample periods would still be small compared to the desired accuracy of 1 millisecond for non-image sensors. Gyroscope array interface(s) 112 provides an interface for gyroscope data captured by a gyroscope. Magnetometer/accelerometer interface(s) 113 provides an interface for data captured by magnetometers or accelerators. In one embodiment, these other sensors communicate over a polling Serial Peripheral Interface (SPI) interface, and the sensor devices are continually polled until a sample is available. The SPI interface also introduces a small amount of latency between when a sample is recorded and when it is read. This latency is also small—approximately 20 microseconds worst case—compared to the desired accuracy of 1 millisecond.

Each of the non-image sensor interfaces includes a timestamp recorder to tag data from the non-image sensors with timestamps that are received from timestamp generator 107. That is, microphone array interface(s) 111 includes timestamp recorder 111A to tag audio data captured by microphones with a timestamp from timestamp generator 107. Gyroscope array interface(s) 112 includes timestamp recorder 112A to tag gyroscope data captured by a gyroscope with a timestamp from timestamp generator 107. Magnetometer/accelerometer interface(s) 113 includes timestamp recorder 113A to tag data captured by magnetometers or accelerators with a timestamp from timestamp generator 107.

Once all data (image and non-image) is time-stamped, host interface 120 prepares the data for transmission to a host computing device. That is, the tagged data from image sensors from camera interfaces 105 and from non-image sensors are sent to host interface 120 for transmission to host computing device. Host interface 120 aggregates and stores sensor data until it can be sent to the host. At that time, host interface 120 packages the data into a suitable format for transmission. In one embodiment, the formatting of the data is optimized to any of the host interfaces to the FPGA (e.g., MIPI, Peripheral Component Interconnect Express (PCIe), universal serial bus (USB), etc.).

Figure 1B:
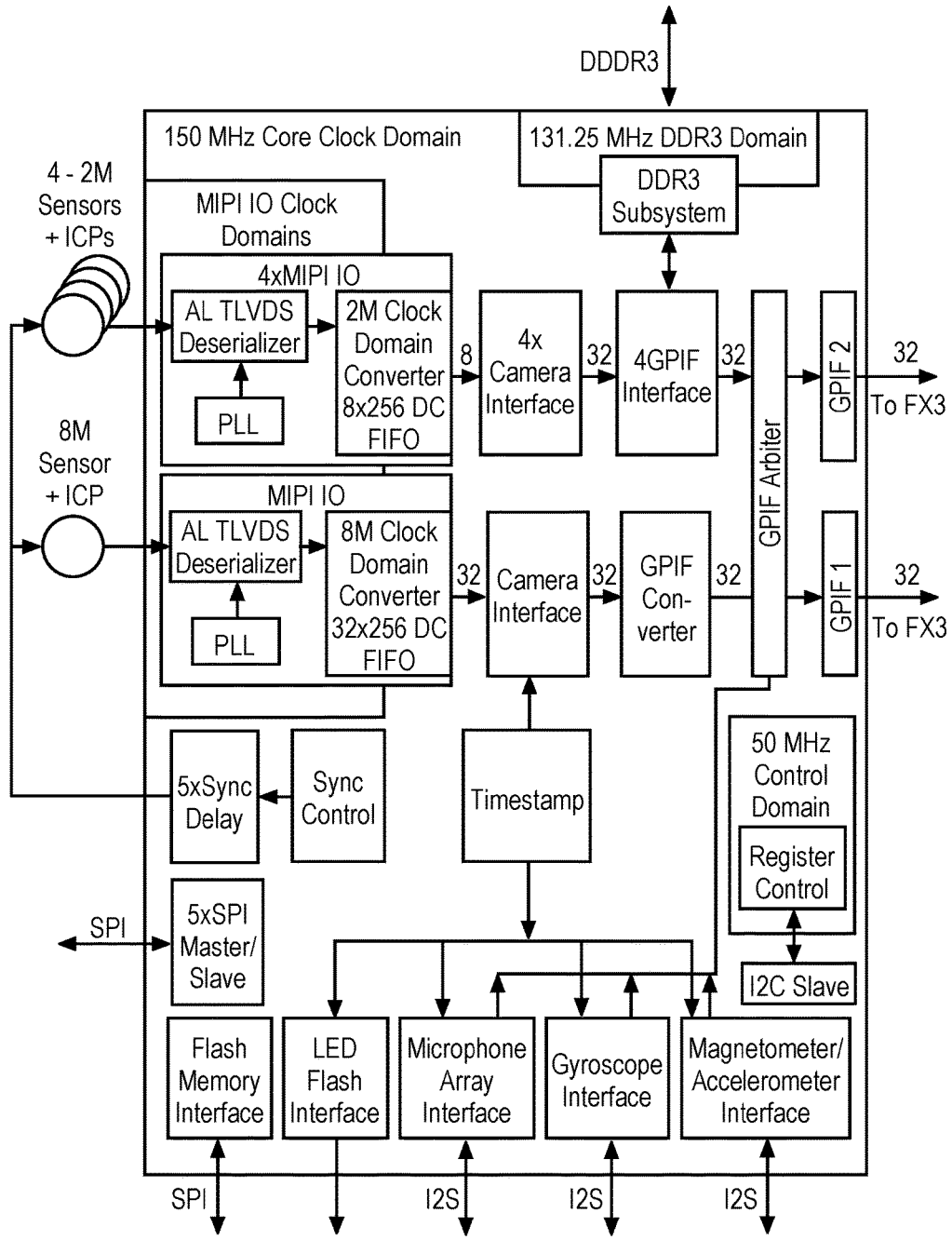
FIG. 1B is a block diagram of a more detailed embodiment of a multi-camera, multi-sensor system.

FIG. 1B is a block diagram of a more detailed embodiment of a multi-camera, multi-sensor system. One skilled in the art would recognize and understand the operation of the components that are included in FIG. 1B, but have been omitted or not shown explicitly in FIG. 1A.

The frames from stream sources are first received by the device-driver (referred to herein as the VMS driver) module which is part of the multi-camera system shown in FIG. 1A. In one embodiment, the driver continually collects frames. Collected frames of each capture are put together as a frameset. The time-aligned staging algorithm uses the timestamp of the first arrived frame and sets it as the reference for that capture period, where a series of capture periods makes up a video. The timestamps from other cameras and sensors are compared to this reference. Should the timestamps meet the predefined conditions, these frame are considered valid, and the driver adds that frame to the current frameset. In one embodiment, the predefined conditions are met when the time of the timestamp falls within the current frameset's threshold period, which is equal to the frameset reference timestamp plus or minus a threshold time.

The driver also allows the user to mask off the stream sources deemed not-necessary for the frameset. In other words, data in streams can be discarded. This allows the system to prevent an unused stream from consuming shared resources (e.g., CPU cycles, USB bandwidth, DDR3 memory, etc.). In one embodiment, the masking is accomplished by the FPGA (e.g., FRPGA 100) at the input interface. This is important in embodiments where the image sensors are configured to continuously generate images. If one can turn off or ignore a stream, then resynchronization of the stream may be necessary when it is turned back on. Masking avoids the need for resynchronization as the stream is not turned off.

For any given instant of the time, a time-aligned staging process (e.g., algorithm) allows frames from other stream sources to be newer or older than the reference frame by a certain threshold period. In one embodiment, the threshold period is based on the frame margin variable:

$$\text{frame\_margin} = (\text{frame\_period\_usec}/2) - 10 \text{ microseconds}$$

where the frame_period_usec=1/frame rate in microseconds. To convert frame rate in seconds to a frame rate in microseconds, the frame rate is divided into seconds (fps) by 1,000,000. In one embodiment, the frame_rates are 10, 15, 30 frame per second and the user can choose to use one of these 3 frame rate options. In one embodiment, the threshold period is 10 microsecond less than half of the frame rate in micro seconds unit.

In one embodiment, all unmasked stream sources (i.e., stream sources that are desired for capture) have a timestamp value within a deviation less than the threshold compared to the frameset reference timestamp. A frameset is complete when frames from all unmasked stream sources aligned within the threshold period have been obtained.

Figure 2:
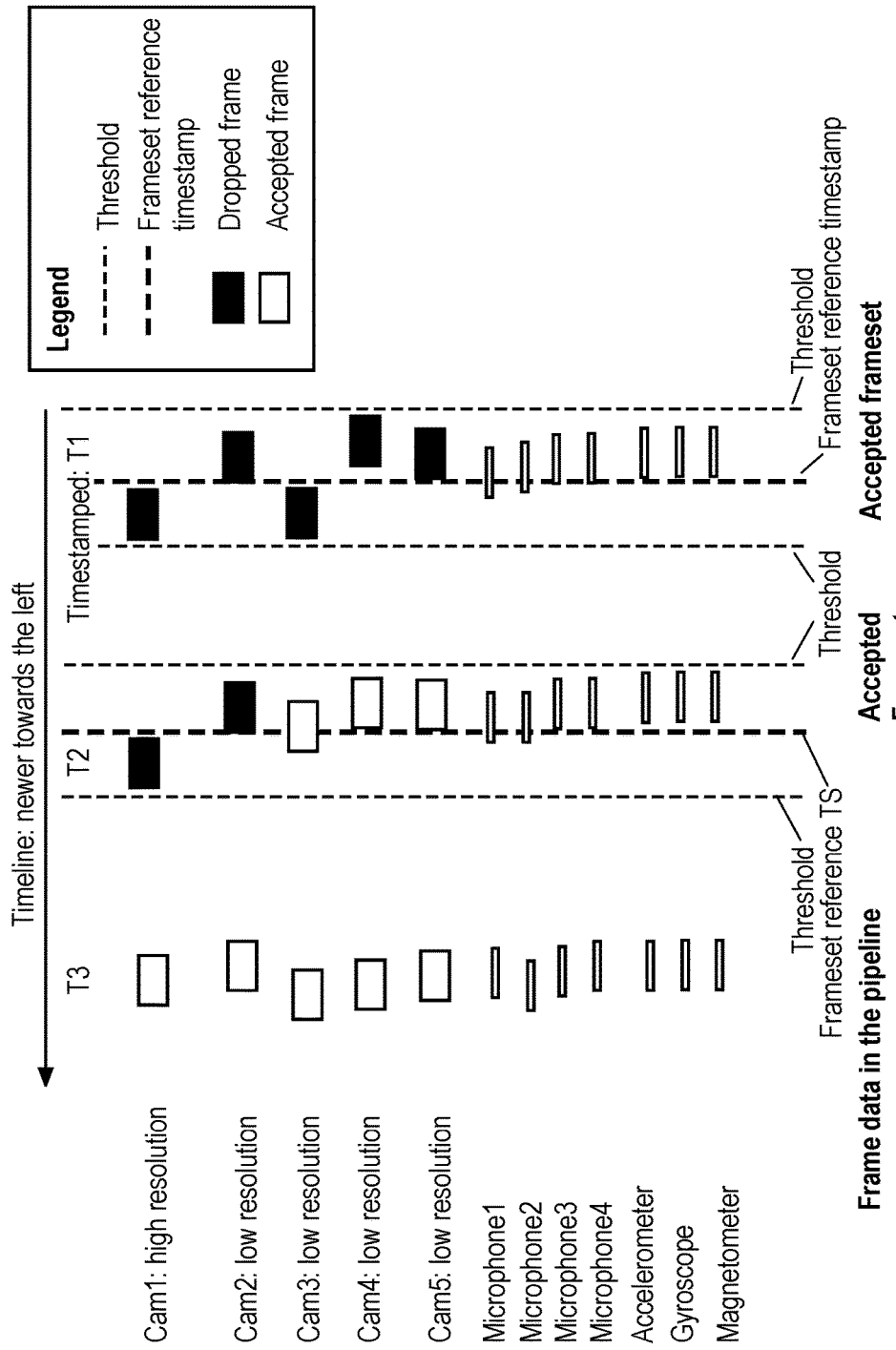
FIG. 2 illustrates an example of accepted framesets.

FIG. 2 illustrates an example of accepted framesets. Referring to FIG. 2, frames for frames for framesets with reference timestamps T1 and T2 are all shown within a threshold time difference of a reference timestamp. Therefore, the frames for framesets with reference frameset timestamp T1 and T2 represent accepted framesets. The frames for frameset with reference frameset timestamp T3 represent frame data in the pipeline.

Figure 3:
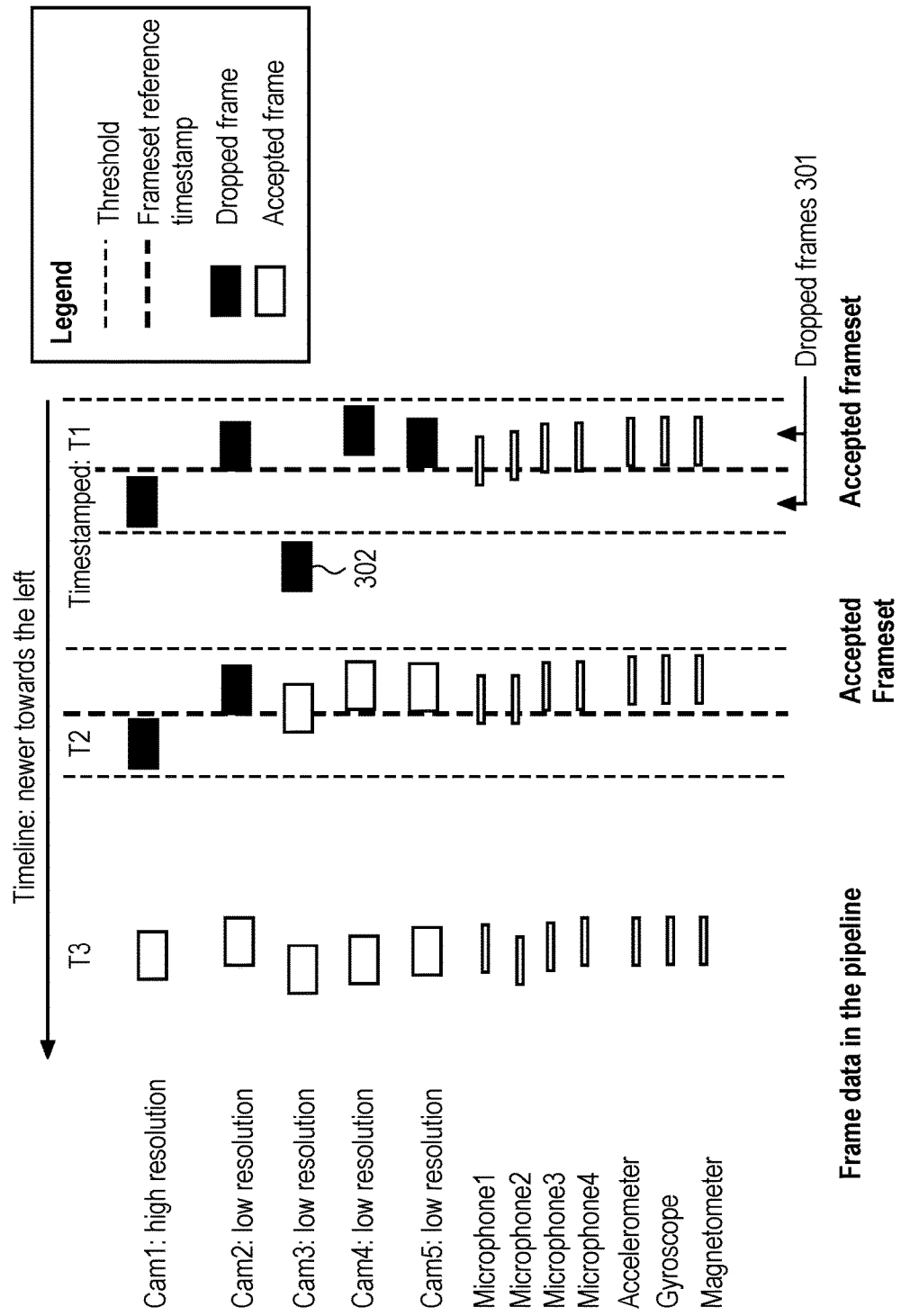
FIG. 3 illustrates an example of an incoming frame being too new and failing the timestamp threshold difference.

In one embodiment, if the newly arrived frame for that capture window is much newer (newer than the frameset reference timestamp+threshold period in on embodiment), then the time-aligned staging process takes the incoming frame and drops frames collected so far for that capture window, and waits for more frames to complete the frameset for the new reference timestamp. This is because in one embodiment, the newer frame is preferred over the older one. A frameset is complete when we have frames from all unmasked stream sources aligned within the threshold period. FIG. 3 illustrates an example of an incoming frame being too new and failing the timestamp difference threshold. Referring to FIG. 3, at timestamp T1, the frame 301 is dropped because it falls outside of the threshold time difference. Frames 302 are discarded because they do not form a complete frameset since there is no accepted frame from Cam3. Referring to FIG. 3, reference frameset timestamp T1, frames 301 are dropped because the frame 302 is much newer (newer than the current frameset reference timestamp (T1)+threshold period). The timestamp for frame 302 will be used as frameset reference timestamp instead of T1, and frame 302 will be kept inside of this frameset.

Figure 4:
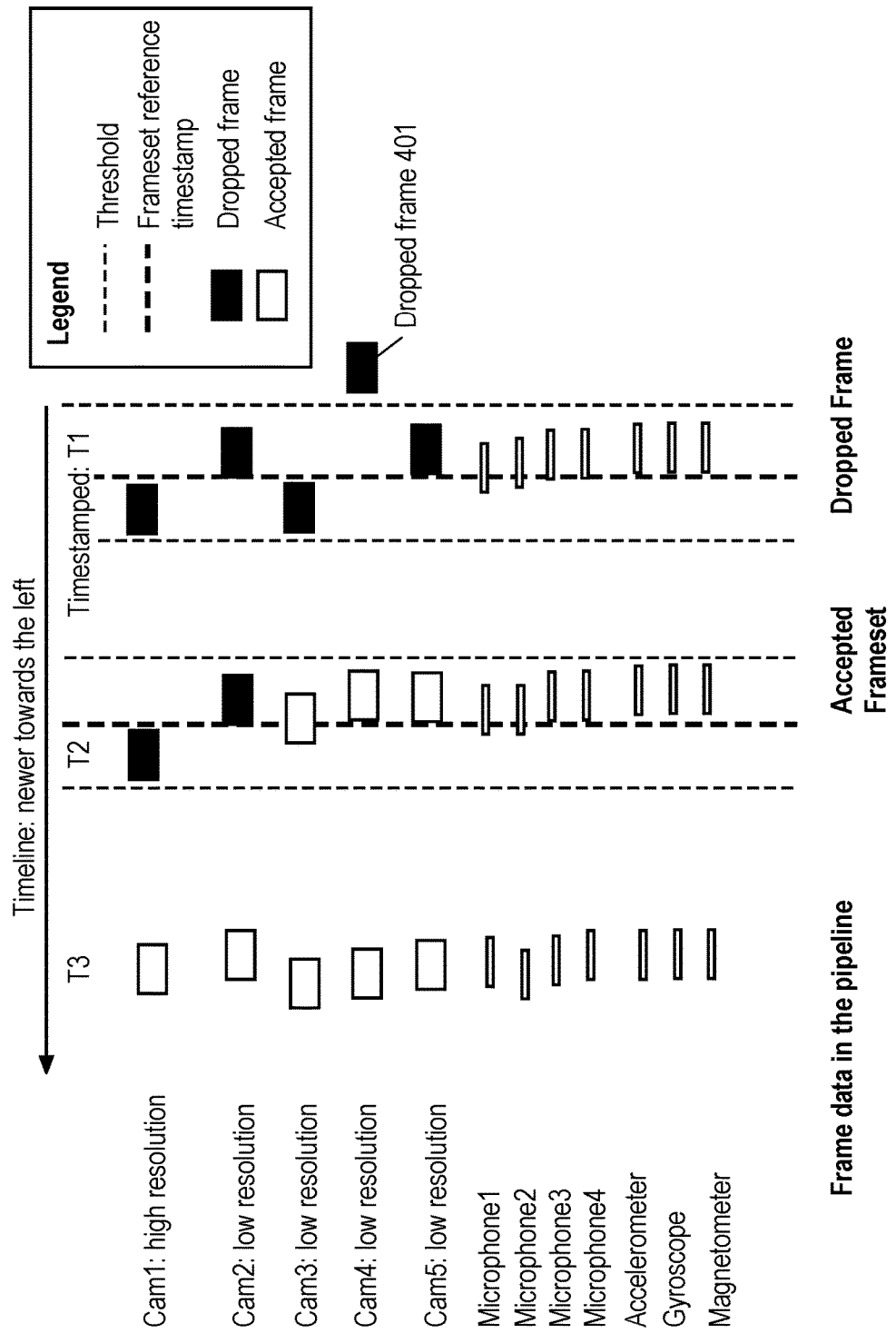
FIG. 4 illustrates an example of a frame being too old and being dropped in response thereto.

If the newly arrived frame for that capture period is much older (older than the frameset reference timestamp minus threshold period in one embodiment), then the time-aligned staging process drops the newly arrived frame and waits for the next frame of the stream source. A frameset is complete when we have frames from all unmasked stream sources aligned within the threshold period. FIG. 4 illustrates a frameset failing the threshold check and being dropped for being too old. Referring to FIG. 4, at frameset with reference frameset timestamp T1, the frame 401 from Cam4 is much older than the rest of the streams (older than threshold+/− reference timestamp). This means that Cam4 data is way too old and are to be dropped. The rest are still new (within the threshold), so they are pass the timestamp check. The frameset will wait for a new frame from the same stream as the dropped frame, in order to complete the frameset.

In one embodiment, while still waiting for all unmasked frames to fill the current frameset, there shouldn't be more than 1 frame from one same stream source. If there is, the frame with the older timestamp is dropped, and the frame with the newer timestamp is kept in the frameset.

In one embodiment, after the time align staging process puts together framesets, they are arranged in a way that enables easy retrieval. If frames in framesets were merely copied to a block of memory in order to be ready for retrieval, there are too many bits of data to copy, thereby consuming a lot of time and memory resource. In order to avoid copying bits of data, in one embodiment, an output FIFO process (e.g., algorithm) rearranges frameset pointers into a data structure to enable easy retrieval of framesets in correct order, rather than copying bits of the frameset data itself. More specifically, in memory, both the address (e.g., a pointer) and the corresponding data are stored. When streaming data comes in to the host computer's memory, it could be at any address, and is not always in order. For the video stream to make sense, the frame data should be in the order of how the frames were captured in time. In one embodiment, the output FIFO process keeps a map of the order of the frame data, so that the video replay makes sense, and in sequence of how they're originally captured. Not having to copy bits saves time and memory resources.

DETAILS OF VARIOUS EMBODIMENTS

In one embodiment, valid framesets are created with a 10 micro-second synchronization. This involves driving the frame-capture at the multiple cameras in a synchronous fashion. During post-capture, the frames from these cameras can be delayed arriving at the multi-camera FPGA (or other processing device) for a variety of reasons, including latency in the image signal processing block. The time-aligned staging process described herein ensures that the frame-sets are assembled and validated at the back-end of the data-chain before these sets are supplied to the application layer.

Figure 5:
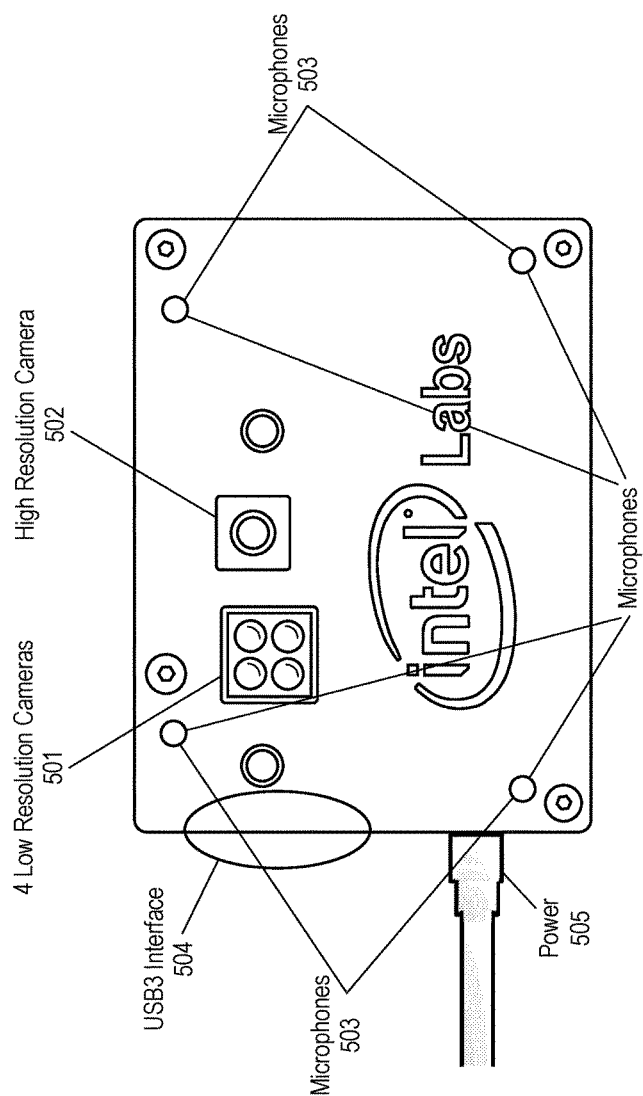
FIG. 5 is a diagram depicting a camera system.

FIG. 5 illustrates one embodiment of multi-camera. Such a multi-camera may be used for 3D multimedia capturing. Referring to FIG. 5, multi-camera system 500 comprises a high resolution 8 Mega pixel camera 502, 4×2 Mega Pixel cameras 501, 4 microphones 503, gyroscope, magnetometer and accelerometer sensor (not shown), an external interface 504 (e.g., USB3), and power 505. The cameras and non-image sensors are referred to herein as stream sources.

Stereo camera systems have 2 cameras. Each camera captures the scene from its unique perspective, and this perspective with its parallax is used to calculate depth. The multi-camera system 500 has 5 cameras, with each camera capturing a different perspective. Depth information in multi-camera is calculated by detecting pixel correspondences across the five captured. To obtain accurate disparity maps and depth characterization of the scene, all frames should be captured at the same instant so that any motion in the scene is sampled at the same exact instant. The multi-camera hardware described herein provides camera synchronization and time-stamping. While the hardware synchronization drives all the cameras to capture the frames in a synchronous manner, these image frames can be delayed traveling through the system prior to the assembly of the frameset. In one embodiment, software implements the time-aligned staging process to guarantee framesets with a high accuracy of timestamp alignment.

Once the framesets are successfully assembled and sent to the output of the time-aligned staging process, an output FIFO process arranges the framesets with zero frame data copy into a data structure that is easy to retrieve later. In other words, the frame data is not copied to line up the frames in the order that they were captured; instead, the addresses of the frames a lined up, via pointers. Both the time align staging and output FIFO process are part of the multi-camera driver, which is executed by a host system.

Figure 6:
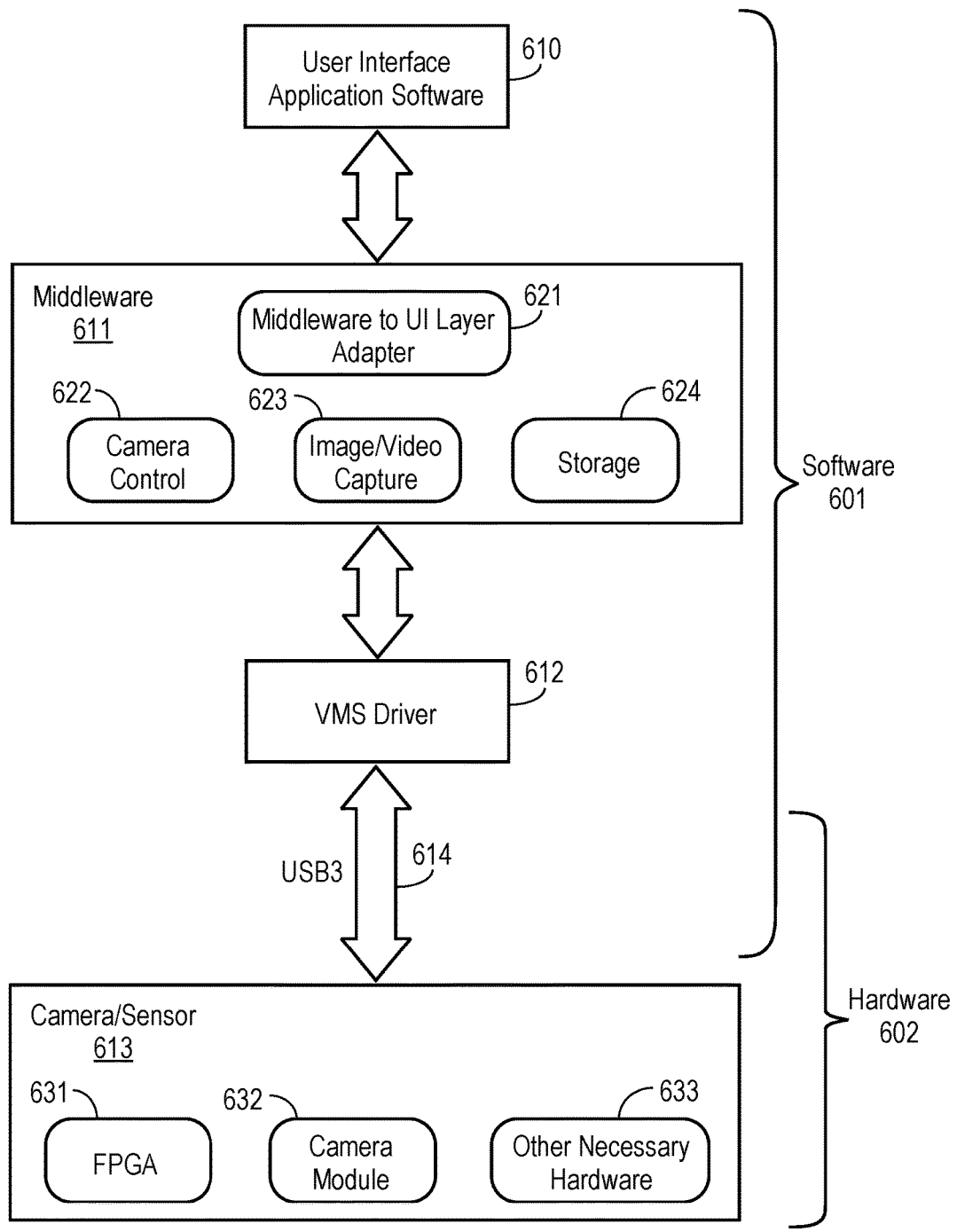
FIG. 6 illustrates a high-level software architecture for one embodiment of a multi-camera, multi-sensor system.

FIG. 6 illustrates a high-level software architecture for one embodiment of a multi-camera, multi-sensor system. Referring to FIG. 6, the high level software architecture for the multi-camera, multi-sensor system includes software 601, which operates in conjunction with hardware 602 in the system. Software 601 includes user interface application software 610, middleware 611, and VMS driver 612. Middleware 611 includes a middleware-to-UI layer adapter module 621 to allow middleware 611 to interface with the user interface application software 610. Middleware 611 also includes camera control module 622, image/video capture module 622, and storage module 624 to control storage and retrieval data such as frames and frame sets.

Hardware 602 includes camera/sensor hardware 613 and interface 614. Interface 614 interfaces the camera/sensor hardware 613 to the VMS driver 612 and may include both hardware and software components. Camera/sensor hardware 613 includes processing device 631. In one embodiment, processing device 631 comprises an FPGA, such as the FPGA shown in FIG. 1A. Camera/sensor hardware 613 includes camera module 632 and other necessary hardware 633. Other necessary hardware 633 could include memories and/or interface components to enable the hardware components to work together.

As shown in FIG. 6, the hardware platform 602 has cameras, microphones, gyroscope, magnetometer, and accelerometer sensors. FPGA 631 performs a number of functions related to camera command and control and data management, including the timestamping of the data. VMS driver 612 is the software that interacts with the multi-camera hardware 602. Middleware 611 provides an interface from user interface software 610 to VMS driver 612. During video or image capture, user interface application software 610 sends a command to middleware 611 requesting a capture. Camera control module 622 in middleware 611 handles this transaction and requests VMS driver 612 to capture frames from camera module 632 in multi-camera hardware 613. VMS driver 612 takes the frame data, reconstructs it and arranges it into a data structure that is ready for middleware 611 to retrieve for user interface application software 610. In one embodiment, the time align staging algorithm and output FIFO algorithm run in VMS driver 612.

In one embodiment, data transfer between VMS driver 612 and the multi-camera hardware 613 is through Universal Serial Bus 3 (USB3) interface 614. USB3 was chosen because it provides high speed data transfer. Other interfaces may be used such as, for example, Mobile Industry Processor Interface (MIPI), Peripheral Component Interconnect Express (PCIe), Thunderbolt, Universal Serial Bus-C(USB-C), etc.

Middleware 611 retrieves the data for user interface application software 610. Middleware 611 also provides a video or image data storage option 624 for user interface application software 610, just like how we save image or video in files for later use. That is, middleware 611 is able to control the storage and retrieval of image or video on behalf of user interface application software 610.

In one embodiment, VMS driver 612 also provides camera control features, for example setting frame rate of the camera, and other camera configurations. During camera control, user interface application software 610 sends control command(s) to middleware 611. Camera control module 622 of middleware 611 handles that and requests VMS driver 612 to interface with the hardware to control one or more cameras in camera module 632. In one embodiment, VMS driver 612 uses USB3 interface 614 to perform accesses to the camera.

Figure 7:
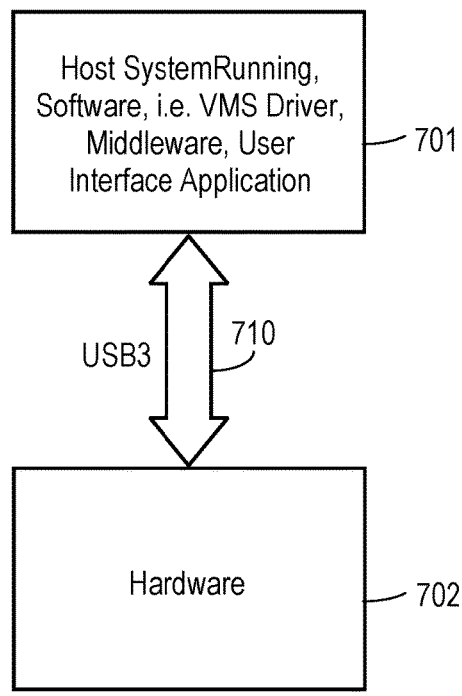
FIG. 7 illustrates a physical system diagram for one embodiment of a multi-camera, multi-sensor system.

FIG. 7 illustrates one embodiment of a physical system diagram for a multi-camera, multi-sensor system. Referring to FIG. 7, the multi-camera, multi-sensor physical system diagram illustrates hardware 702 interfacing to host system 701 via interface 710. As set forth above, interface 710 may comprise a USB3 interface. Host system 701 includes the host system running software such as, the VMS driver, middleware, the user interface application. In one embodiment, these components are the same as set forth in FIG. 6.

Figure 8:
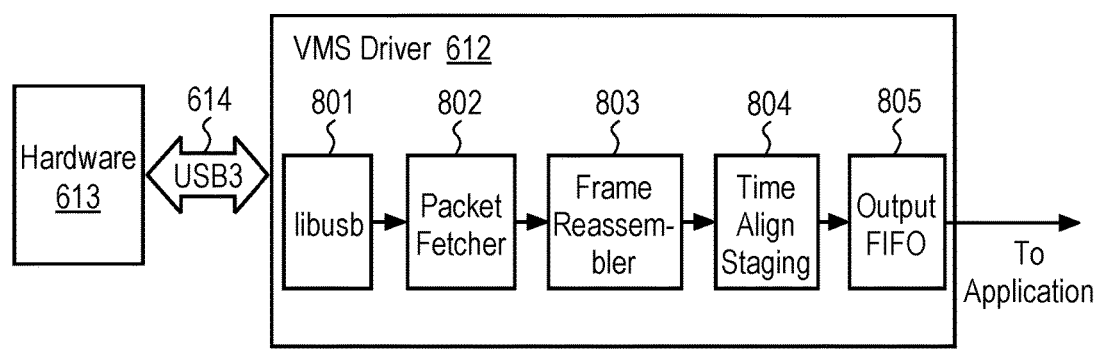
FIG. 8 is a data flow diagram of one embodiment of a driver for use in a multi-camera, multi-sensor system.

In one embodiment, when capturing video or images, the frame data is processed in different stages in order to finally get the data in the format that is easy for consumption. Data flow for one embodiment of the VMS driver is depicted in FIG. 8. Referring to FIG. 8, the data flow for VMS driver 612 includes Libusb module 801, packet fetcher module 802, frame reassemble module 803, time align staging module 804, and output FIFO software module 805. The time align staging process/algorithm runs in time align staging module 804, and output FIFO process/algorithm runs in output FIFO module 805.

When stream sources (e.g., cameras, sensors, and microphones) capture video, frame data is sent from multi-camera hardware to the host system as USB data packets over the USB3 link. Libusb module 801 is a USB3 interface software library. Next, packet fetcher module 802 fetches USB data packets from the USB3 link, using Libusb module 801.

Frame reassembler module 803 assembles USB data packets into frames. The number of packets that form a frame is dependent on the sensor and system settings. For example, the USB transfer unit is fixed at 8 k bytes and an image size varies based on the image type (e.g., RAW, JPEG, YUV . . . ), and in the case of JPEG, compression settings and image content. If a JPEG image was 100 kB, it would require 13 USB packets (13*8=104). If the compression settings changed and the size increased to 200 kB, it would require 25 USB packets. Thus, the system settings control, at least in part, the number of packets that are formed.

Once a complete frame of data has been reassembled, it is submitted to time align staging module 804. Here, newly reassembled frames are staged until the time-aligned frames from all active streams arrive. Once all frames for a given capture period have been reassembled, the entire frameset is processed by output FIFO module 805, and ready to be retrieved by application software on demand.

The time align staging algorithm of time align staging module 804 aligns frames from different stream sources into a frameset based on the timestamp of each frame. In one embodiment, the algorithm is designed to assemble a single frameset at a time, since the hardware is built to serialize frames between framesets. That is, it should not send a frame to the host that belongs to the second frameset, until the last frame of the first frameset is sent to the host.

Below is one embodiment of a "time align staging" algorithm.

1. Start a new frameset. At this point, there are no frames in the frameset yet.
2. Wait for an incoming frame as a candidate to add to the current frame set. Once a frame arrives, proceed to the next step.
3. If this is the first frame of the frameset, i.e., the frameset is empty, and when an incoming frame is received, use the timestamp of the incoming frame as the current frameset reference timestamp, and then proceed to the next step. The current frameset reference timestamp is referred to herein as the "frameset_reference_timestamp". If this is not the first frame of the frameset, proceed to the next step.
4. Determine if the incoming frame is too old (case a), too new (case b), duplicate with what we already have in the current frameset (case c), or not (case d). In one embodiment, the action taken on each case is as follows:
   a. If the incoming frame is too old, then do the following:
      Drop the incoming frame
      Update the aligned frame drop counter, which keeps statistics on dropped frames
      Wait for a new frame
      The idea behind this is the newer frame data is preferred over the older one. In one embodiment, the incoming frame is too old when:
      frameset_reference_timestamp>incoming_frame_timestamp
      And
      frameset_reference_timestamp−incoming_frame_timestamp>frame_margin
      where frame_margin=(frame_period_usec/2)−10 microseconds and frame_period_usec=1/frame rate in microseconds
   b. If the incoming frame is too new, then do the following:
      Drop all frames in the current frameset
      Update the aligned frame drop counter
      Add the incoming frame to the current frameset
      Update the current frameset reference timestamp with the incoming frame timestamp
      Continue waiting for new frames from other stream sources to fill in the current frameset.
      The idea behind this is if there is a much newer frame arriving, it means the frames accumulated so far in the current frameset are too old and should be dropped. Frames coming in from this point in time on will be newer.
      In one embodiment, the incoming frame is too new when:
      incoming_frame_timestamp>frameset_reference_timestamp
      And
      incoming_frame_timestamp−frameset_reference_timestamp>frame_margin
      where frame_margin=(frame_period_usec/2)−10 microseconds
      and frame_period_usec=1/frame rate in microseconds
   c. If this incoming frame is from the stream source we already have a frame in the current frameset, then replace the existing frame with the incoming frame, update duplicate frame drop counter. The newer frame data is preferred over the older one.

d. In all other cases, which means the incoming frame fits within the current frame time, or not duplicating frame from the same stream source we already have in the frameset, add the incoming frame to the current frame set.

In one embodiment, the incoming frame fits within the current frame time when:

incoming_frame_timestamp>frameset_reference_timestamp−frame_margin

And incoming_frame_timestamp<frameset_reference_timestamp+frame_margin where frame_margin=(frame_period_usec/2)−10 microseconds and frame_period_usec=1/frame rate in microseconds 5. Check if current frameset is complete, i.e., if frames have been received from all unmasked stream sources in the current frameset.

a. If the current frameset is complete, output the current frameset to Output FIFO module, described herein, to arrange framesets in a data structure that's ready for application software to retrieve. Then go back to step #1.

b. If the current frameset is not complete, go back to step #2.

Figure 9:
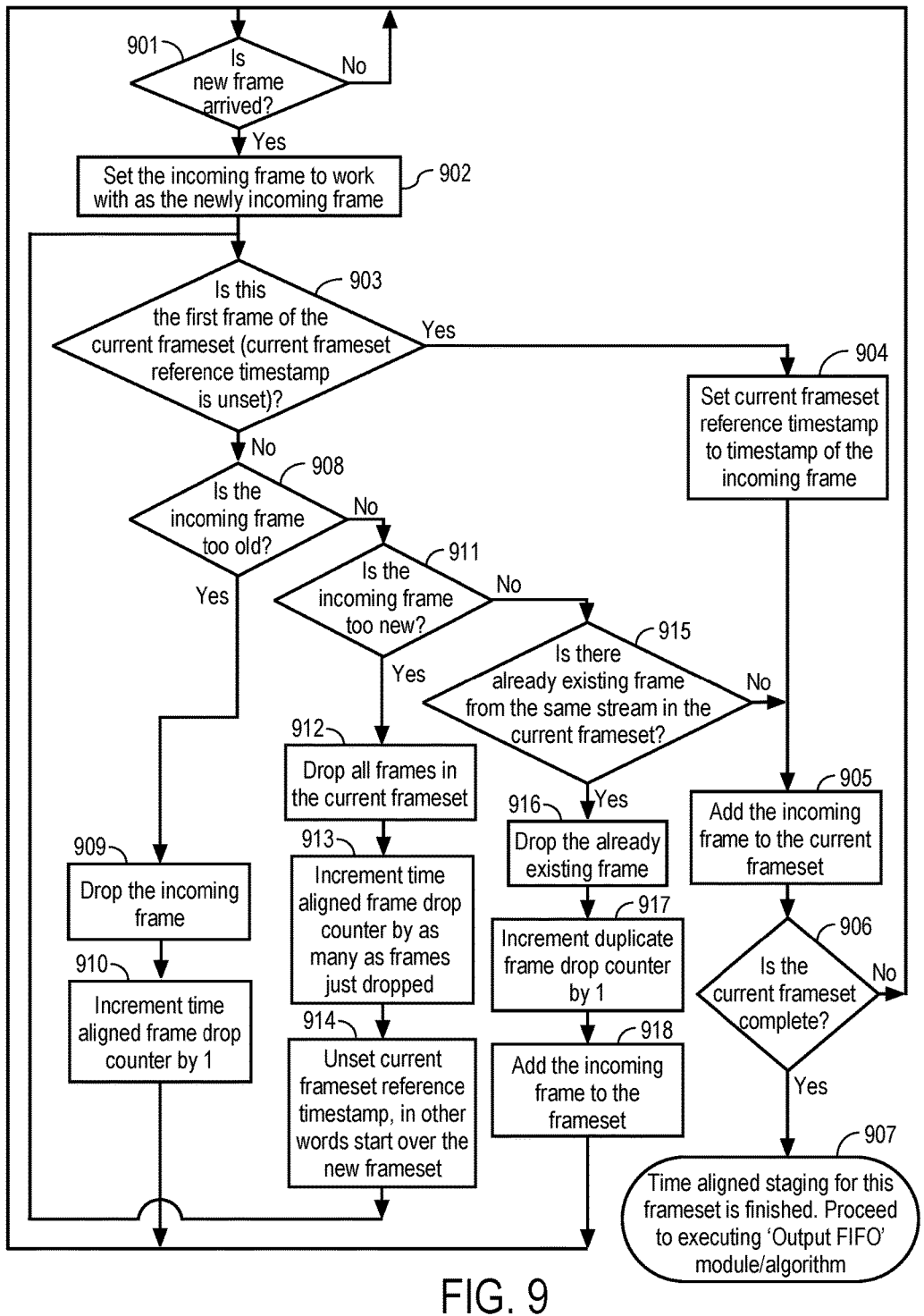
FIG. 9 is a flow diagram of one embodiment of a time align staging process.

FIG. 9 is a flow diagram of one embodiment of a time align staging process. In one embodiment, the process is performed by processing logic that may comprise hardware (circuitry, dedicated logic, etc.), software (such as is run on a general purpose computer system or a dedicated machine), firmware, or a combination of the three.

Referring to FIG. 9, the process begins by processing logic determining if a new frame has arrived (processing block 901). If not, the process stays at processing block 901 until a new frame arrives. If a new frame does arrive, the process transitions to processing block 902 where processing logic sets the incoming frame to work with as the newly incoming frame and processing logic tests whether this is the first frame of the current frameset (processing block 903). In one embodiment, this is determined by checking whether the current frameset reference timestamp is unset. If it is, the process transitions to processing block 904 where processing logic sets the current frameset reference timestamp to the timestamp of the incoming frame. Processing logic also adds the incoming frame to the current frame set (processing block 905) and test whether the current frameset is complete (processing block 906). If it is not, the process transitions to processing block 901 and the process repeats itself. If the frameset is complete, processing logic transitions to processing block 907 where processing logic indicates that the time aligned staging for this frameset has completed. At this point, the process transitions to executing the output FIFO module and associated processing to prepare the data for use by the application software and the host system.

If the newly incoming frame is not the first frame in the current frameset as determined at processing block 903, then the process transitions to processing block 908 where processing logic determines if the incoming frame is too old. If it is, the process drops the incoming frame (processing block 909), increments the time aligned frame drop counter by 1 (processing block 910), and transitions to processing block 901, where the process repeats.

If the incoming frame is not too old at processing block 908, then the process transitions to processing block 911 where processing logic tests whether the incoming frame is too new. If it is, then processing logic drops all frames in the current frameset (processing block 912), increments the time aligned frame drop counter by as many as frames as have just been dropped (processing block 913), unsets the current frameset reference timestamp (processing block 914), and returns to processing block 903 where the process repeats. In one embodiment, unsetting the current frameset reference timestamp is essentially starting over with a new frameset.

If the incoming frame is not too new, then processing logic transitions to processing block 915 where processing logic tests whether there is already an existing frame from the same stream in the current frameset. If there is, then processing logic drops the already existing frame (processing block 916), increments the duplicate frame drop counter by one (processing block 917), adds the incoming frame to the frameset (processing block 918), and returns to processing block 901 to repeat the process.

If there is not an already existing frame from the same stream in the current frameset (processing block 915), the process transitions to processing block 905.

Since the time align staging algorithm includes the frame drop counters, in one embodiment, the VMS driver provides an option for the software that interfaces with the driver to query the frame drop counters in order to perform a desired action. If a frame drop alarm would be desired, it is implemented in a layer above the driver. The time align staging algorithm in the driver gives this flexibility so that the software that interfaces with the driver can design appropriate action in the presence of frame drops. For example, application software could monitor frame drop counter and detect a non-working stream source and perform action such as, for example, but not limited to, disable the sensor, raise an alarm, prompt the user or stop capturing.

Once aligned framesets are achieved from time align staging algorithm, the Output FIFO algorithm arranges the framesets. In one embodiment, the arranging is performed for easy consumption. In one embodiment, the output FIFO algorithm executes every time a new frameset is ready.

Figure 10:
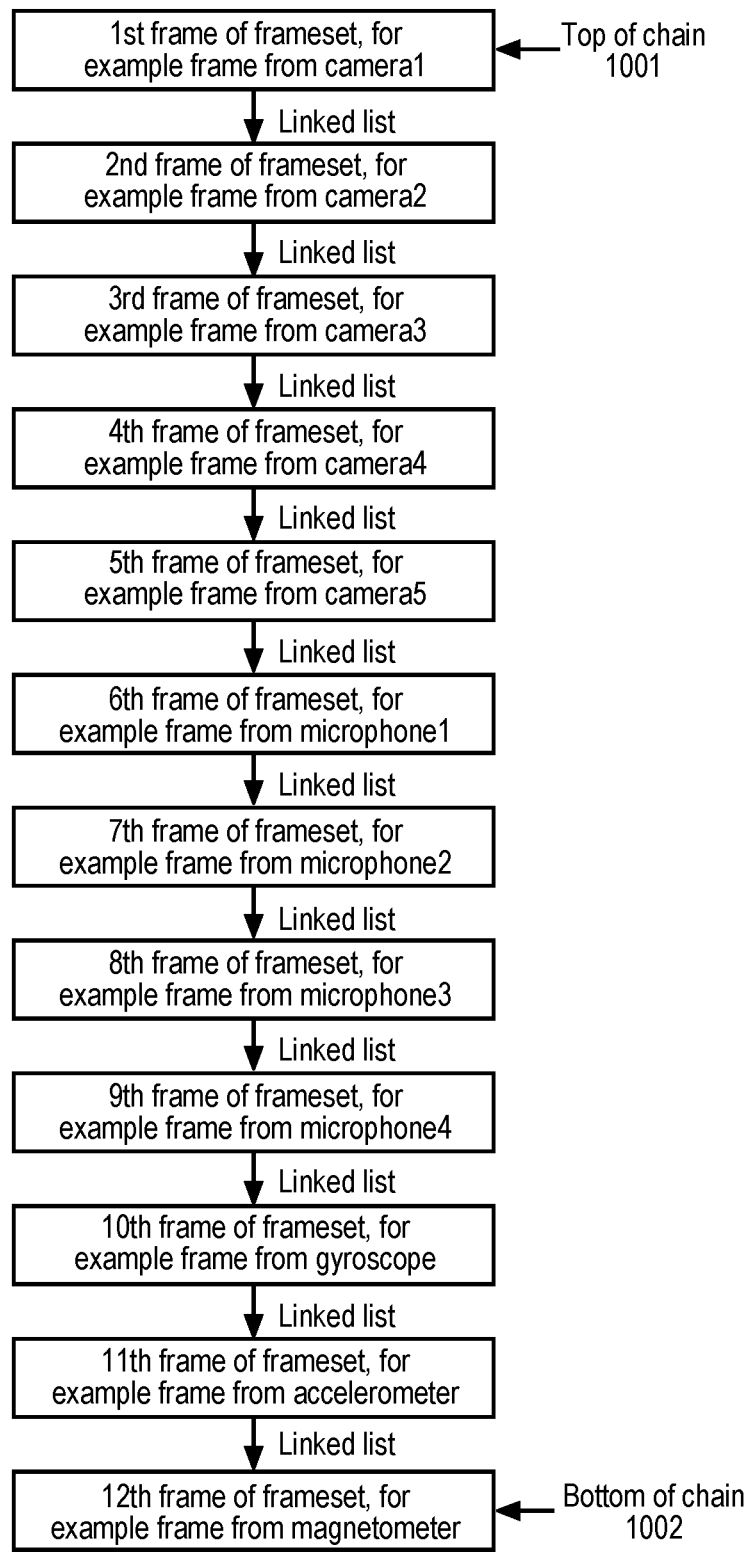
FIG. 10 illustrates frames being link listed together in a frameset.

Output FIFO algorithm links all frames in a frameset together into a chain. Each chain has top of the chain, which is the pointer to the first frame of the frameset. FIG. 10 illustrates frames link listed together in a frameset. Referring to FIG. 10, frames 1-12 of a frameset are shown with a top of chain 1001 and a bottom of chain 1002.

Figure 11:
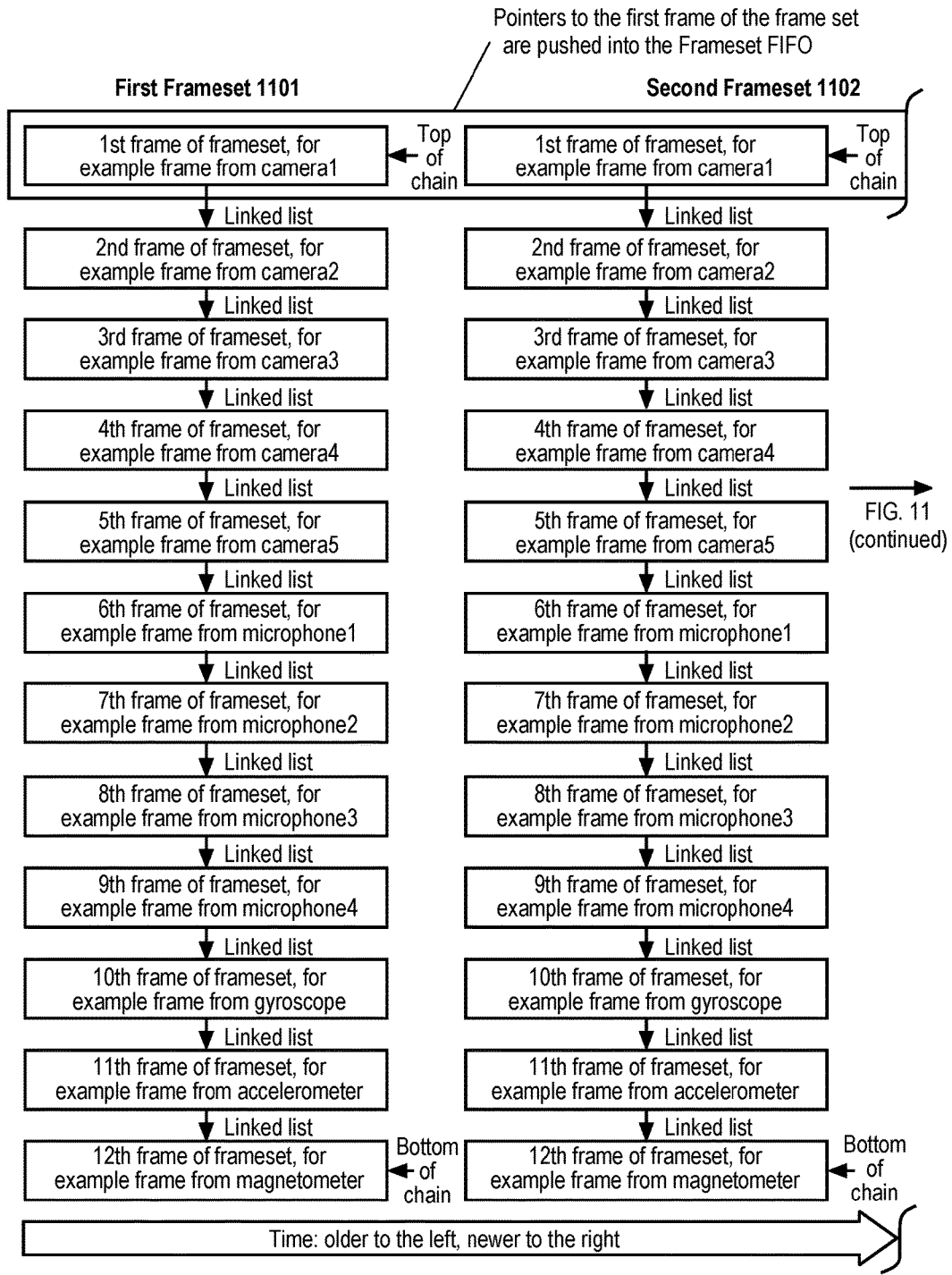
FIG. 11 illustrates a series of framesets in video data.
Figure 11:
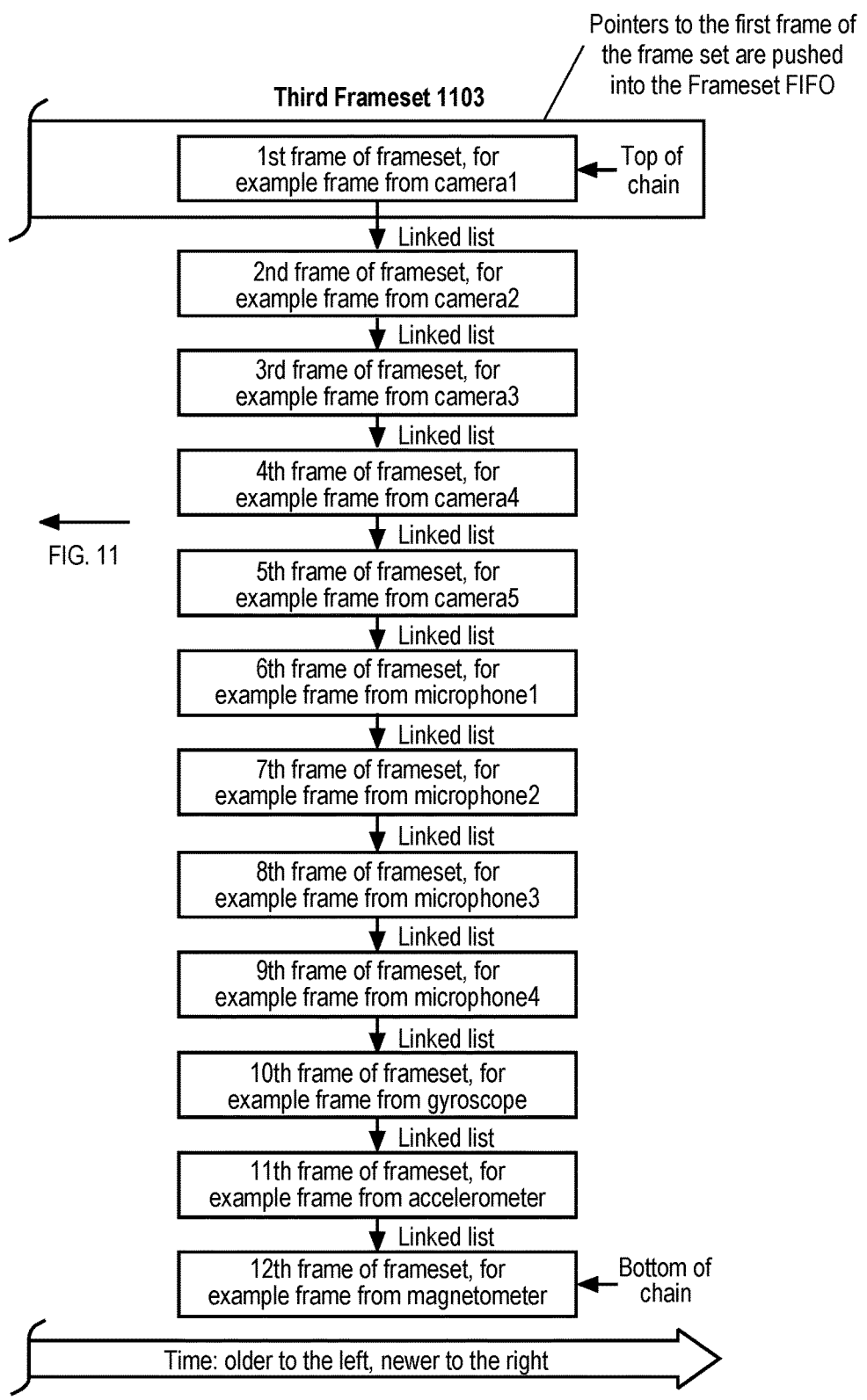

Video data has a series of framesets representing moving pictures, audio, and other corresponding sensor data frames. FIG. 11 is an example of the output FIFO algorithm arranging video data. Referring to FIG. 11, framesets 1101, 1102 and 1103 are shown and each has 12 frames. Pointers to the first frame of the first frameset (at the top of the chain) are pushed into the frameset FIFO.

In one embodiment, the output FIFO algorithm stores top of the chain locations (as known as pointers) into a FIFO referred to herein as Frameset FIFO. Video data, which is series of framesets, can be retrieved by popping the Frameset FIFO, and traversing through linked list for frames in each frameset.

TABLE illustrating a Frameset FIFO:

| | |
|---|---|
| Pointer to $1^{st}$ frame of 3rd frameset | \|<- Top of fifo\| |
| Pointer to $1^{st}$ frame of 2nd frameset | |
| Pointer to $1^{st}$ frame of 1st frameset | \|<- Bottom of fifo\| |

Below is one embodiment of the output FIFO algorithm operations when storing framesets:

1) Check if the incoming frameset is expected. If not, update unwanted frame counter, and go back to waiting for new frame data. When all stream sources are disabled or masked, the frameset is not expected.

2) Chain framesets into a FIFO as a multimedia video stream. Each frameset contains captured video, audio and other sensor frames. For each frameset, the VMS driver link lists the frames within a frameset into a chain. The VMS driver marks and knows the top of the chain, and bottom of the chain of the linked list.

3) The pointer to the frame, which is the top of the chain, is pushed into the Frameset FIFO. Once done, the VMS driver marks the frameset are done so that work isn't accidentally repeated on it. In one embodiment, this is marked by resetting a frameset reference timestamp (not the timestamps of the frames in the frameset).

Figure 12:
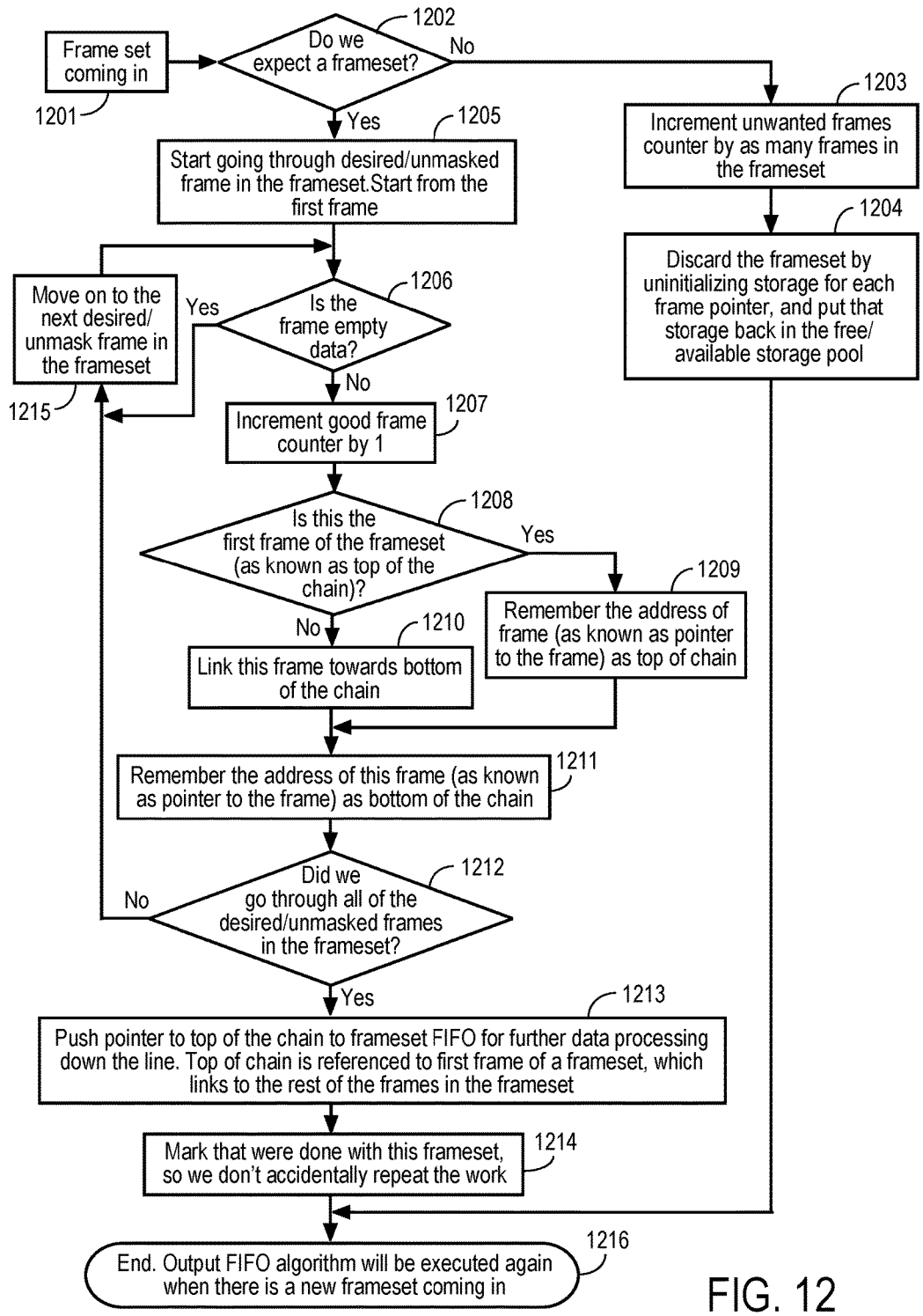
FIG. 12 is a flow diagram of one embodiment of an output first-in first-out (FIFO) process.

FIG. 12 is a flow diagram of one embodiment of an Output FIFO process.

In one embodiment, the process is performed by processing logic that may comprise hardware (circuitry, dedicated logic, etc.), software (such as is run on a general purpose computer system or a dedicated machine), firmware, or a combination of the three. In one embodiment, this process is performed by the VMS driver.

Referring to FIG. 12, the process begins with processing logic receiving a frameset (processing block 1201). Processing logic then tests whether a frameset is expected (processing block 1202). If not, the process transitions to processing block 1203 where an unwanted frames counter is incremented by as many frames as there are in the frameset. Also, processing logic discards the frameset by uninitializing the storage for each frame pointer and putting the storage back into the free/available storage pool (processing block 1204). Thereafter, the process transitions to processing block 1216.

If a frameset is expected at processing block 1202, then processing logic starts going through the desired/unmasked frame(s) in the frameset, starting with the first frame (processing block 1205). Thereafter, processing logic tests whether the frame is empty (processing block 1206). If it is, then the process transitions to processing block 1215, where processing moves on the next desired/unmasked frame in the frameset, and if so, the process transitions to processing block 1206.

If the frame is not empty (e.g., a null pointer) as determined in processing block 1206, processing logic increments the good frame counter by one (processing block 1207) and tests whether the frame is the first frame of the frameset (known herein as the top of the chain) (processing block 1208). If it is, then processing logic transitions to processing block 1209 where processing logic remembers the address of the frame as the top of the chain, which is referred to as the pointer to the frame, and transitions to processing block 1211. If the frame is not the first frame in the frameset, processing logic links this frame towards the bottom of the chain (processing block 1210) and transitions to processing block 1211.

At processing block 1211, processing logic remembers the address of the frame as the bottom of the chain. Again, this address of the frame is known as the pointer to the frame. Then, processing logic tests whether all of the desired/unmasked frames in the frameset have been gone through (processing block 1212). If not, then processing logic transitions to processing block 1215. If so, processing logic transitions to processing block 1213 where processing logic puts the pointer to the top of the chain to the frameset FIFO for further data processing down the line. The top of the chain is referenced to the first frame of the frameset, which links to the rest of the frames in the frameset. Then processing logic marks that the frameset has been completed (processing block 1214). Note that this insures that work is not accidentally repeated.

Finally, processing logic executes the output FIFO process/algorithm again when there is a new frameset coming in (processing block 1216).

Note that example embodiments described above prevent partial slices (e.g., frameset with a missing frame from a desired stream source). However, if partial slices are permitted, then the process of FIG. 12 can accommodate them.

Figure 13:
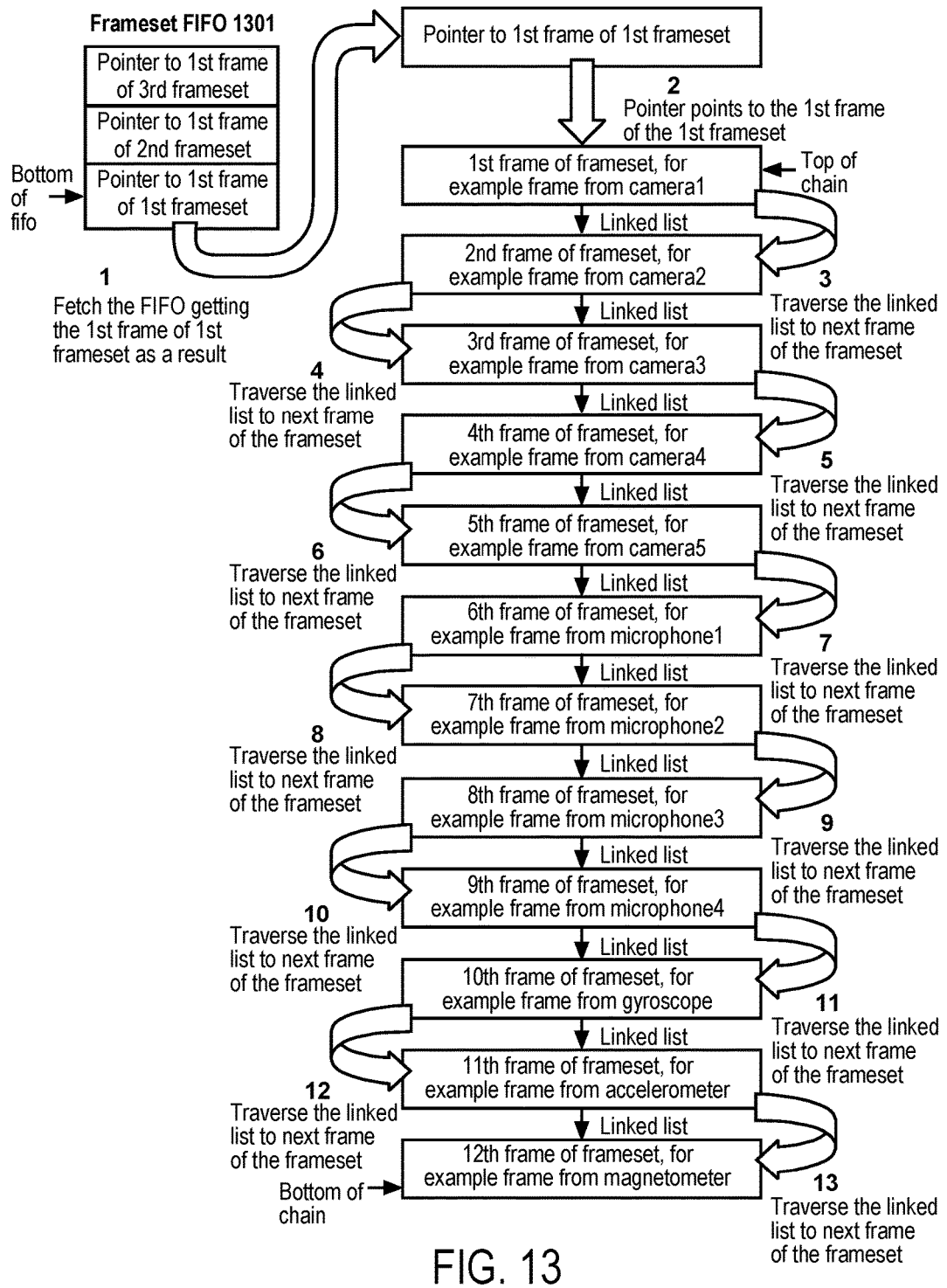
FIG. 13 illustrates retrieving framesets and frames.

In one embodiment, when the video data is retrieved, the retriever (for example application software) only needs to fetch the FIFO for top of chain locations for framesets. From top of chain, traverse through the rest of the chains in order to get the frames in the frameset. FIG. 13 illustrates an example of retrieving framesets and frames. Referring to FIG. 13, the frameset FIFO 1301 stores pointers to the first frame of multiple framesets, such as the first ($1^{st}$), second ($2^{nd}$) and third ($3^{rd}$) framesets. A fetch is made to frameset FIFO 1301 to obtain the pointer to the first frame of the first frameset. This is the top of the chain. From this point, the frames are obtained by traversing through the rest of the chains, each time traversing the linked list to the next frame.

In one embodiment, the output FIFO algorithm is designed to accommodate processing speed with zero frame data copying, as well as saving memory resource. Although the output FIFO algorithm copies a pointer to the frameset data into the frameset FIFO for each frameset, the pointer data size (32 bits if running on a 32b host operating system, and 64 bits if running on a 64 bit host operating system) is much smaller than the frameset data itself (319 k bytes on average). This increases the processing speed tremendously. Based on our experiment with all 12 stream sources enabled and unmasked—5 cameras, 4 microphones, 1 gyroscope, 1 accelerometer, and 1 magnetometer sensor. One frameset is 319,402 bytes on average. Copying 1 frameset takes 2 ms on average. At 30 frame per second, 1 second of video data would be 30 framesets, which would take 30×2 ms=60 ms, and 30×319,402=9,582,060 bytes of memory. However, this time and memory space are not consumed because the output FIFO algorithm only copies 32 or 64 bits (for 32 or 64 bits Android environment) of pointer to the frameset instead.

Figure 14:
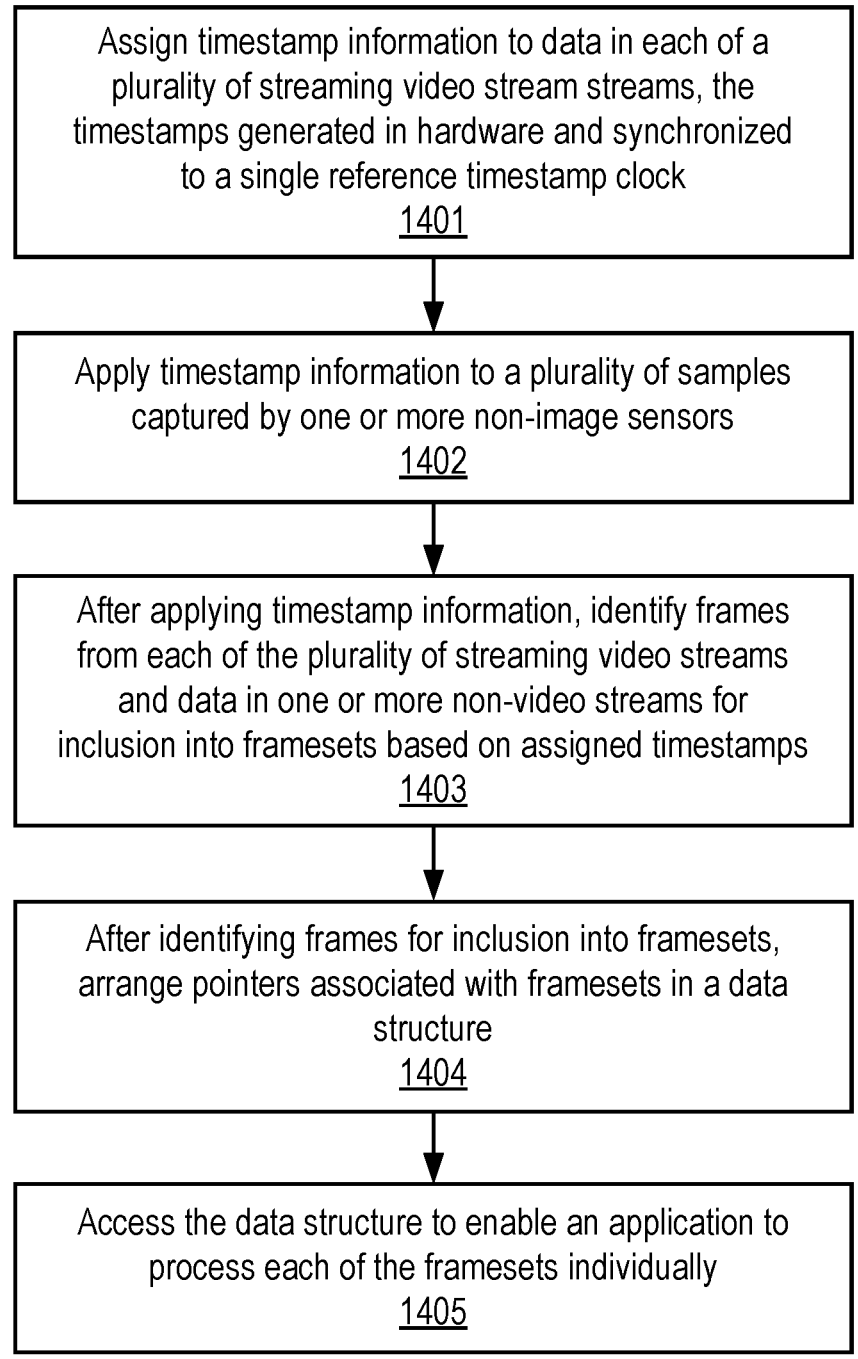
FIG. 14 is a flow diagram of one embodiment of a process for managing data in a multi-camera, multi-sensor system using timestamps.

FIG. 14 is a flow diagram of one embodiment of a process for managing data in a multi-camera, multi-sensor system using timestamps. In one embodiment, the process is performed by processing logic that may comprise hardware (circuitry, dedicated logic, etc.), software (such as is run on a general purpose computer system or a dedicated machine), firmware, or a combination of the three.

Referring to FIG. 14, the process begins by assigning timestamp information to data in each of a plurality of streaming video stream streams, the timestamps generated in hardware and synchronized to a single reference timestamp clock (processing block 1401).

Processing logic also applies timestamp information to a plurality of samples captured by one or more non-image sensors (processing block 1402). In one embodiment, applying timestamp information to a plurality of samples captured by one or more non-image sensors of the plurality of capture devices is based on a time when a first of the plurality of samples is received by timestamping logic after a start of frame indicator has been received. In one embodiment, applying timestamp information to the plurality of samples comprises aggregating samples captured during an image capture frame period into a single packet of non-image data and assigning one timestamp to each single packet of non-image data.

After applying timestamp information, processing logic identifies frames from each of the plurality of streaming video streams and data from one or more non-video streams for inclusion into framesets based on reference timestamps (processing block 1403). In one embodiment, identifying frames from each of the plurality of streaming video streams and data in one or more non-video streams for inclusion into framesets comprises identifying frames from each of the plurality of streaming video streams and data from one or more non-video streams that have a timestamp that is within a threshold time value from a reference time stamp value of a frameset for inclusion in the frameset. In one embodiment, identifying frames from each of the plurality of streaming video streams and data in one or more non-video streams for inclusion into framesets comprises discarding at least one frameset frame with the associated reference timestamp for a capture window if a newly arrived frame for the capture window is newer and has a timestamp larger than the frameset reference timestamp plus a threshold. In one embodiment, discarding the at least one frameset frame with the associated reference timestamp for the capture window comprises discarding all frameset frames and adding the newly arrived frame into the frameset. In one embodiment, identifying frames from each of the plurality of streaming video streams and data in one or more non-video streams for inclusion into framesets based on assigned timestamps comprises discarding a frameset frame of a stream source and having the associated timestamp for a capture window if a newly arrived frame for the capture window from the stream source is newer based on the associated timestamp. In one embodiment, identifying frames from each of the plurality of streaming video streams and data in one or more non-video streams for inclusion into framesets based on assigned timestamps comprises discarding a newly arrived frame for a capture window if a timestamp of the newly arrived frame is older than a reference timestamp for the capture window by an amount equal to a threshold.

After identifying frames for inclusion into framesets, processing logic arranges pointers associated with framesets in a data structure (processing block 1404). In one embodiment, this includes link listing frames in each frameset into a chain and pushing a pointer to an initial frame of the frameset into a frameset first-in, first-out (FIFO) buffer.

Next, processing logic accesses the data structure to enable an application to process each of the framesets individually (processing block 1405). In one embodiment, this includes popping a frameset FIFO to obtain a pointer to an initial frame at a top of the chain of the frameset and traversing through a linked list for frames in each frameset. In essence this enables an application to process each frameset of the framesets by providing an indication of frames included in said each frameset to the processing device.

Time align staging algorithm makes it possible to produce time-coherent sets of data from multiple sensor streams transmitted asynchronously and incoherently to a processing entity. Time align staging algorithm is designed to resolve multimedia data distortion due to frame drop. In one embodiment, the output FIFO algorithm reduces video data processing time, memory, and resources required. Thus, with the time align staging and output FIFO algorithms working together, synchronized framesets are achieved, and resources are utilized efficiently.

Figure 15:
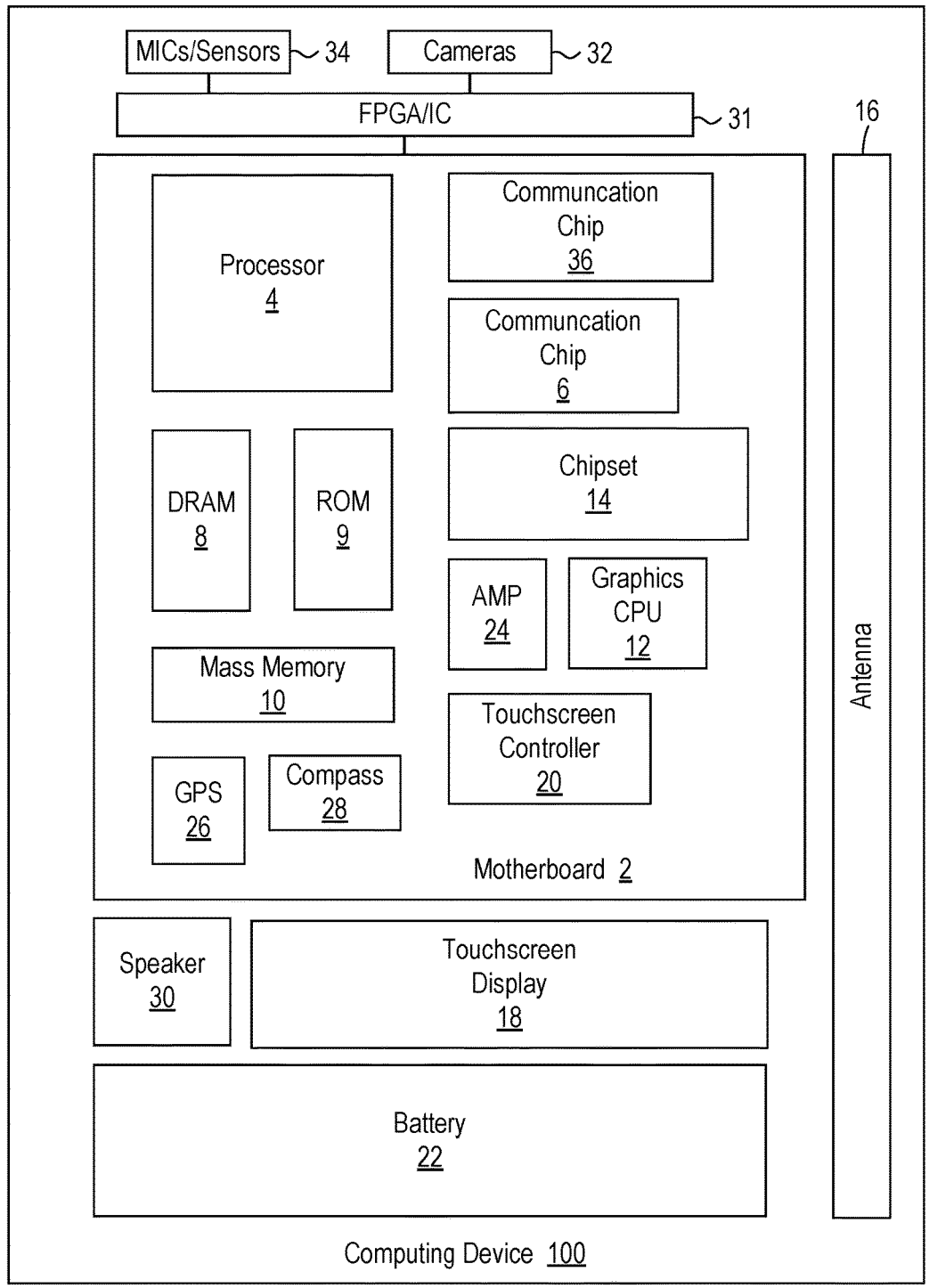
FIG. 15 is a block diagram of one embodiment of a portable image capture device.

FIG. 15 illustrates a portable image capture device 100 in accordance with one implementation. The imaging device 100 houses a system board 2. The board 2 may include a number of components, including but not limited to a camera array 32 as described above, a processor 4, and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone (or other sensor) array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

In one embodiment, camera array 32 and microphone/sensor array 34 are coupled to image processing chip 36 (e.g., an imaging signal processor) and/or to the processor 4, either directly or through the image chip, via FGPA/IC 31, which is described above. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a stand-alone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras of camera array 32 may include all of the components of the camera or share resources, such as memory 8, 9, 10, processing 4 and user interface 12, 20, with other video device components and functions. The processor 4 is coupled to camera array 32 and to memory to receive frames and produce enhanced images. In one embodiment, cameras of camera array 32 include an image capture sensor(s) and color filter array described above. In one embodiment, cameras of camera array 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

In a first example embodiment, a device comprises a plurality of interfaces operable to receive streaming data from each of a plurality of image and non-image capture devices; timestamping logic implemented, at least in part, in hardware and coupled to the plurality of interfaces to generate and assign timestamp information to each set of data captured by individual capture devices of the plurality of image and non-image capture devices to indicate when the data was captured, wherein the timestamp information is synchronized to a single timestamp reference clock; and a processing logic coupled to the timestamping logic to group image data from image capture devices with data from non-image capture devices using the timestamp information.

In another example embodiment, the subject matter of the first example embodiment can optionally include that the timestamping logic is operable to assign timestamp information to data in each of a plurality of streaming video stream streams and to apply timestamp information to a plurality of samples captured by one or more non-image capture devices, and further wherein the processing logic is operable to identify frames from each of the plurality of streaming video streams and data in one or more non-video streams for inclusion into framesets based on assigned timestamps.

In another example embodiment, the subject matter of the first example embodiment can optionally include that the processing logic is operable to identify frames from each of the plurality of streaming video streams and data in one or more non-video streams for inclusion into framesets by, at least in part, identifying frames from each of the plurality of streaming video streams and data in one or more non-video streams that have a timestamp that is within a threshold time value from a reference time stamp value of a frameset for inclusion in the frameset.

In another example embodiment, the subject matter of the first example embodiment can optionally include that the processing logic is operable to identify frames from each of the plurality of streaming video streams and data in one or more non-video streams for inclusion into framesets by, at least in part, discarding at least one frameset frame with the associated reference timestamp for a capture window if a newly arrived frame for the capture window is newer and has a timestamp larger than the frameset reference timestamp plus a threshold.

In another example embodiment, the subject matter of the first example embodiment can optionally include that the processing logic is operable to discard the at least one frameset frame with the associated reference timestamp for the capture window by, at least in part, discarding all frameset frames and adding the newly arrived frame into the frameset.

In another example embodiment, the subject matter of the first example embodiment can optionally include that the processing logic is operable to identify frames from each of the plurality of streaming video streams and data in one or more non-video streams for inclusion into framesets by, at least in part, discarding a frameset frame of a stream source and having the associated timestamp for a capture window if a newly arrived frame for the capture window from the stream source is newer based on the associated timestamp.

In another example embodiment, the subject matter of the first example embodiment can optionally include that the processing logic is operable to identify frames from each of the plurality of streaming video streams and data in one or more non-video streams for inclusion into framesets by, at least in part, discarding a newly arrived frame for a capture window if a timestamp of the newly arrived frame is older than a reference timestamp for the capture window by an amount equal to a threshold.

In another example embodiment, the subject matter of the first example embodiment can optionally include that the processing logic is operable to arrange pointers associated with framesets in a data structure, which is accessible to an application to process each of the framesets individually.

In another example embodiment, the subject matter of the first example embodiment can optionally include that frames in each frameset are link listed into a chain.

In another example embodiment, the subject matter of the first example embodiment can optionally include that the timestamping logic is operable to apply timestamp information to a plurality of samples captured by one or more non-image sensors of the plurality of capture devices based on a time when a first of the plurality of samples is received by timestamping logic after a start of frame indicator has been received. In another example embodiment, the subject matter of this example embodiment can optionally include that the timestamping logic is operable to apply timestamp information to the plurality of samples by aggregating samples captured during an image capture frame period into a single packet of non-image data and assigning one timestamp to each single packet of non-image data.

In a second example embodiment, a method comprises assigning timestamp information to data in each of a plurality of streaming video stream streams, the timestamps generated in hardware and synchronized to a single reference timestamp clock, applying timestamp information to a plurality of samples captured by one or more non-image sensors, and identifying frames from each of the plurality of streaming video streams and data in one or more non-video streams for inclusion into framesets based on assigned timestamps.

In another example embodiment, the subject matter of the second example embodiment can optionally include that identifying frames from each of the plurality of streaming video streams and data in one or more non-video streams for inclusion into framesets based on assigned timestamps comprises identifying frames from each of the plurality of streaming video streams and data in one or more non-video streams that have a timestamp that is within a threshold time value from a reference time stamp value of a frameset for inclusion in the frameset.

In another example embodiment, the subject matter of the second example embodiment can optionally include that identifying frames from each of the plurality of streaming video streams and data in one or more non-video streams for inclusion into framesets based on assigned timestamps comprises discarding at least one frameset frame with the associated reference timestamp for a capture window if a newly arrived frame for the capture window is newer and has a timestamp larger than the frameset reference timestamp plus a threshold. In another example embodiment, the subject matter of this example embodiment can optionally include that discarding the at least one frameset frame with the associated reference timestamp for the capture window comprises discarding all frameset frames and adding the newly arrived frame into the frameset.

In another example embodiment, the subject matter of the second example embodiment can optionally include that identifying frames from each of the plurality of streaming video streams and data in one or more non-video streams for inclusion into framesets based on assigned timestamps comprises discarding a frameset frame of a stream source and having the associated timestamp for a capture window if a newly arrived frame for the capture window from the stream source is newer based on the associated timestamp.

In another example embodiment, the subject matter of the second example embodiment can optionally include that identifying frames from each of the plurality of streaming video streams and data in one or more non-video streams for inclusion into framesets based on assigned timestamps comprises discarding a newly arrived frame for a capture window if a timestamp of the newly arrived frame is older than a reference timestamp for the capture window by an amount equal to a threshold.

In another example embodiment, the subject matter of the second example embodiment can optionally include linked listing frames of each frameset and arranging pointers associated with the framesets in a data structure. In another example embodiment, the subject matter of this example embodiment can optionally include accessing the data structure to enable an application to process each of the framesets individually.

In another example embodiment, the subject matter of the second example embodiment can optionally include popping a frameset FIFO to obtain a pointer to an initial frame at a top of the chain of the frameset and traversing through a linked list for frames in each frameset.

In a third example embodiment, an article of manufacture has one or more non-transitory computer readable media storing instructions which, when executed by a system, cause the system to perform a method comprising assigning timestamp information to data in each of a plurality of streaming video stream streams, the timestamps generated in hardware and synchronized to a single reference timestamp clock, applying timestamp information to a plurality of samples captured by one or more non-image sensors, and identifying frames from each of the plurality of streaming video streams and data in one or more non-video streams for inclusion into framesets based on assigned timestamps.

In another example embodiment, the subject matter of the third example embodiment can optionally include that identifying frames from each of the plurality of streaming video streams and data in one or more non-video streams for inclusion into framesets based on assigned timestamps comprises identifying frames from each of the plurality of streaming video streams and data in one or more non-video streams that have a timestamp that is within a threshold time value from a reference time stamp value of a frameset for inclusion in the frameset.

In another example embodiment, the subject matter of the third example embodiment can optionally include that the method further comprises linked listing frames of each frameset, arranging pointers associated with the framesets in a data structure, and accessing the data structure to enable an application to process each of the framesets individually.

In a fourth example embodiment, a system comprises: a plurality of image and non-image capture devices; a device comprising a plurality of interfaces operable to receive streaming data from each of a plurality of image and non-image capture devices and timestamping logic implemented, at least in part, in hardware and coupled to the plurality of interfaces to generate and assign timestamp information to each set of data captured by individual capture devices of the plurality of image and non-image capture devices to indicate when the data was captured, wherein the timestamp information is synchronized to a single timestamp reference clock; and a processing logic coupled to the timestamping logic to group image data from image capture devices with data from non-image capture devices using the timestamp information.

In another example embodiment, the subject matter of the fourth example embodiment can optionally include that the timestamping logic is operable to assign timestamp information to data in each of a plurality of streaming video stream streams and to apply timestamp information to a plurality of samples captured by one or more non-image capture devices, and further wherein the processing logic is operable to identify frames from each of the plurality of streaming video streams and data in one or more non-video streams for inclusion into framesets based on assigned timestamps.

In another example embodiment, the subject matter of the fourth example embodiment can optionally include that the processing logic is operable to identify frames from each of the plurality of streaming video streams and data in one or more non-video streams for inclusion into framesets by, at least in part, identifying frames from each of the plurality of streaming video streams and data in one or more non-video streams that have a timestamp that is within a threshold time value from a reference time stamp value of a frameset for inclusion in the frameset.

In another example embodiment, the subject matter of the fourth example embodiment can optionally include that the processing logic is operable to arrange pointers associated with framesets in a data structure, which is accessible to an application to process each of the framesets individually.

In another example embodiment, the subject matter of the fourth example embodiment can optionally include that the processing logic is operable to linked list frames in each frameset into a chain.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A device comprising:
a plurality of interfaces operable to receive streaming data from each of a plurality of image and non-image capture devices; and
timestamping logic implemented, at least in part, in hardware and coupled to the plurality of interfaces to generate and assign timestamp information to each set of data captured by individual capture devices of the plurality of image and non-image capture devices to indicate when the data was captured, wherein the timestamp information is synchronized to a single timestamp reference clock, wherein the timestamping logic is operable to assign timestamp information to data in each of a plurality of streaming video stream streams and to apply timestamp information to a plurality of samples captured by one or more non-image capture devices, and further wherein the processing logic is operable to identify frames from each of the plurality of streaming video streams and data in one or more non-video streams for inclusion into framesets based on assigned timestamps; and
a processing logic coupled to the timestamping logic to group image data from image capture devices with data from non-image capture devices using the timestamp information.

2. The device defined in claim 1 wherein the processing logic is operable to identify frames from each of the plurality of streaming video streams and data in one or more non-video streams for inclusion into framesets by, at least in part, identifying frames from each of the plurality of streaming video streams and data in one or more non-video streams that have a timestamp that is within a threshold time value from a reference time stamp value of a frameset for inclusion in the frameset.

3. The device defined in claim 1 wherein the processing logic is operable to identify frames from each of the plurality of streaming video streams and data in one or more non-video streams for inclusion into framesets by, at least in part, discarding at least one frameset frame with the associated reference timestamp for a capture window if a newly arrived frame for the capture window is newer and has a timestamp larger than the frameset reference timestamp plus a threshold.

4. The device defined in claim 3 wherein the processing logic is operable to discard the at least one frameset frame with the associated reference timestamp for the capture window by, at least in part, discarding all frameset frames and adding the newly arrived frame into the frameset.

5. The device defined in claim 1 wherein the processing logic is operable to identify frames from each of the plurality of streaming video streams and data in one or more non-video streams for inclusion into framesets by, at least in part, discarding a frameset frame of a stream source and having the associated timestamp for a capture window if a newly arrived frame for the capture window from the stream source is newer based on the associated timestamp.

6. The device defined in claim 1 wherein the processing logic is operable to identify frames from each of the plurality of streaming video streams and data in one or more non-video streams for inclusion into framesets by, at least in part, discarding a newly arrived frame for a capture window if a timestamp of the newly arrived frame is older than a reference timestamp for the capture window by an amount equal to a threshold.

7. The device defined in claim 1 wherein the processing logic is operable to arrange pointers associated with framesets in a data structure, which is accessible to an application to process each of the framesets individually.

8. The device defined in claim 1 frames in each frameset are link listed into a chain.

9. A device comprising:
a plurality of interfaces operable to receive streaming data from each of a plurality of image and non-image capture devices; and timestamping logic implemented, at least in part, in hardware and coupled to the plurality of interfaces to generate and assign timestamp information to each set of data captured by individual capture devices of the plurality of image and non-image capture devices to indicate when the data was captured, wherein the timestamp information is synchronized to a single timestamp reference clock, wherein the timestamping logic is operable to apply timestamp information to a plurality of samples captured by one or more non-image sensors of the plurality of capture devices based on a time when a first of the plurality of samples is received by timestamping logic after a start of frame indicator has been received; and a processing logic coupled to the timestamping logic to group image data from image capture devices with data from non-image capture devices using the timestamp information.

10. The device defined in claim 9 wherein the timestamping logic is operable to apply timestamp information to the plurality of samples by aggregating samples captured during an image capture frame period into a single packet of non-image data and assigning one timestamp to each single packet of non-image data.

11. A method comprising:
assigning timestamp information to data in each of a plurality of streaming video stream streams, the timestamps generated in hardware and synchronized to a single reference timestamp clock;
applying timestamp information to a plurality of samples captured by one or more non-image sensors; and
identifying frames from each of the plurality of streaming video streams and data in one or more non-video streams for inclusion into framesets based on assigned timestamps, wherein identifying frames from each of the plurality of streaming video streams and data in one or more non-video streams for inclusion into framesets based on assigned timestamps comprises identifying frames from each of the plurality of streaming video streams and data in one or more non-video streams that have a timestamp that is within a threshold time value from a reference time stamp value of a frameset for inclusion in the frameset.

12. The method defined in claim 11 wherein identifying frames from each of the plurality of streaming video streams and data in one or more non-video streams for inclusion into framesets based on assigned timestamps comprises discarding at least one frameset frame with the associated reference timestamp for a capture window if a newly arrived frame for the capture window is newer and has a timestamp larger than the frameset reference timestamp plus a threshold.

13. The method defined in claim 12 wherein discarding the at least one frameset frame with the associated reference timestamp for the capture window comprises discarding all frameset frames and adding the newly arrived frame into the frameset.

14. The method defined in claim 11 wherein identifying frames from each of the plurality of streaming video streams and data in one or more non-video streams for inclusion into framesets based on assigned timestamps comprises discarding a frameset frame of a stream source and having the associated timestamp for a capture window if a newly arrived frame for the capture window from the stream source is newer based on the associated timestamp.

15. A method comprising:
assigning timestamp information to data in each of a plurality of streaming video stream streams, the timestamps generated in hardware and synchronized to a single reference timestamp clock;
applying timestamp information to a plurality of samples captured by one or more non-image sensors; and
identifying frames from each of the plurality of streaming video streams and data in one or more non-video streams for inclusion into framesets based on assigned timestamps, wherein identifying frames from each of the plurality of streaming video streams and data in one or more non-video streams for inclusion into framesets based on assigned timestamps comprises discarding a newly arrived frame for a capture window if a timestamp of the newly arrived frame is older than a reference timestamp for the capture window by an amount equal to a threshold.

16. The method defined in claim 11 further comprising:
linked listing frames of each frameset; and
arranging pointers associated with the framesets in a data structure.

17. The method defined in claim 16 further comprising accessing the data structure to enable an application to process each of the framesets individually.

18. The method defined in claim 16 further comprising:
popping a frameset FIFO to obtain a pointer to an initial frame at a top of the chain of the frameset;
traversing through a linked list for frames in each frameset.

19. An article of manufacture having one or more non-transitory computer readable media storing instructions which, when executed by a system, cause the system to perform a method comprising:
assigning timestamp information to data in each of a plurality of streaming video stream streams, the timestamps generated in hardware and synchronized to a single reference timestamp clock;
applying timestamp information to a plurality of samples captured by one or more non-image sensors; and
identifying frames from each of the plurality of streaming video streams and data in one or more non-video streams for inclusion into framesets based on assigned timestamps, wherein identifying frames from each of the plurality of streaming video streams and data in one or more non-video streams for inclusion into framesets based on assigned timestamps comprises identifying frames from each of the plurality of streaming video streams and data in one or more non-video streams that have a timestamp that is within a threshold time value from a reference time stamp value of a frameset for inclusion in the frameset.

20. The article of manufacture defined in claim 19 wherein the method further comprises:
linked listing frames of each frameset;
arranging pointers associated with the framesets in a data structure; and
accessing the data structure to enable an application to process each of the framesets individually.

21. A system comprising:
a plurality of image and non-image capture devices;
a device comprising
a plurality of interfaces operable to receive streaming data from each of a plurality of image and non-image capture devices; and
timestamping logic implemented, at least in part, in hardware and coupled to the plurality of interfaces to generate and assign timestamp information to each set of data captured by individual capture devices of the plurality of image and non-image capture devices to indicate when the data was captured, wherein the timestamp information is synchronized to a single timestamp reference clock; and a processing logic coupled to the timestamping logic to group image data from image capture devices with data from non-image capture devices using the timestamp information, wherein the timestamping logic is operable to assign timestamp information to data in each of a plurality of streaming video stream streams and to apply timestamp information to a plurality of samples captured by one or more non-image capture devices, and further wherein the processing logic is operable to identify frames from each of the plurality of streaming video streams and data in one or more non-video streams for inclusion into framesets based on assigned timestamps.

22. The system defined in claim 21 wherein the processing logic is operable to identify frames from each of the plurality of streaming video streams and data in one or more non-video streams for inclusion into framesets by, at least in part, identifying frames from each of the plurality of streaming video streams and data in one or more non-video streams that have a timestamp that is within a threshold time value from a reference time stamp value of a frameset for inclusion in the frameset.

23. The system defined in claim 21 wherein the processing logic is operable to arrange pointers associated with framesets in a data structure, which is accessible to an application to process each of the framesets individually.

24. The system defined in claim 21 the processing logic is operable to linked list frames in each frameset into a chain.

* * * * *